US009429764B2

(12) United States Patent
Harrold et al.

(10) Patent No.: US 9,429,764 B2
(45) Date of Patent: Aug. 30, 2016

(54) CONTROL SYSTEM FOR A DIRECTIONAL LIGHT SOURCE

(71) Applicant: REALD INC., Beverly Hills, CA (US)

(72) Inventors: Jonathan Harrold, Leamington Spa (GB); Graham J. Woodgate, Henley on Thames (GB); Michael G. Robinson, Boulder, CO (US); Roger Landowski, Erie, CO (US)

(73) Assignee: RealD Inc., Beverly Hills, CA (US)

( * ) Notice: Subject to any disclaimer, the term of this patent is extended or adjusted under 35 U.S.C. 154(b) by 402 days.

(21) Appl. No.: 13/897,191

(22) Filed: May 17, 2013

(65) Prior Publication Data

US 2013/0321406 A1 Dec. 5, 2013

Related U.S. Application Data

(60) Provisional application No. 61/649,050, filed on May 18, 2012.

(51) Int. Cl.
*G02B 27/22* (2006.01)
*F21V 8/00* (2006.01)
*H04N 13/04* (2006.01)

(52) U.S. Cl.
CPC .......... *G02B 27/225* (2013.01); *G02B 6/0011* (2013.01); *G02B 6/0048* (2013.01); *G02B 27/22* (2013.01); *H04N 13/047* (2013.01); *H04N 13/0418* (2013.01); *H04N 13/0472* (2013.01); *H04N 13/0475* (2013.01); *H04N 13/0477* (2013.01); *H04N 13/0479* (2013.01); *H04N 13/0481* (2013.01); *G02B 6/002* (2013.01);

(Continued)

(58) Field of Classification Search
CPC ........ G09G 3/003; G09G 3/007; G09G 3/20; G09G 3/34–3/3426; G09G 3/3611; G09G 3/3648; G09G 2300/023; G09G 2310/0237; G02B 6/011; G02B 6/002; G02B 6/0038; G02B 6/0048; G02B 6/0055; G02B 27/22–27/26; H04N 13/0418; H04N 13/0468–13/0486; H04N 2013/0461–2013/0465
See application file for complete search history.

(56) References Cited

U.S. PATENT DOCUMENTS 2,133,121 A 10/1938 Stearns
2,810,905 A 10/1957 Barlow
(Continued)

FOREIGN PATENT DOCUMENTS

CN 1142869 A 2/1997
CN 1377453 A 10/2002
(Continued)

OTHER PUBLICATIONS

International search report and written opinion of international searching authority for co-pending PCT application No. PCT/US2013/041192 mailed Aug. 28, 2013.
(Continued)

*Primary Examiner* — Nathan Danielsen
(74) *Attorney, Agent, or Firm* — Neil G. J. Mothew; Penny L. Lowry

(57) ABSTRACT

Disclosed is an autostereoscopic display apparatus comprising a light guiding valve apparatus including an imaging directional backlight, an illuminator array and an observer tracking system arranged to achieve control of an array of illuminators which may provide a directional display to an observer over a wide lateral and longitudinal viewing range with low flicker.

14 Claims, 32 Drawing Sheets

(52) U.S. Cl.
CPC .......... *G02B 6/0038* (2013.01); *G02B 6/0055* (2013.01); *H04N 13/0452* (2013.01); *H04N 2013/0463* (2013.01)

(56) References Cited

U.S. PATENT DOCUMENTS

| | | | |
|---|---|---|---|
| 5,347,644 A | 9/1994 | Sedlmayr | |
| 5,703,667 A | 12/1997 | Ochiai | |
| 5,727,107 A | 3/1998 | Umemoto et al. | |
| 5,771,066 A | 6/1998 | Barnea | |
| 5,896,225 A | 4/1999 | Chikazawa | |
| 5,903,388 A | 5/1999 | Sedlmayr | |
| 5,959,664 A | 9/1999 | Woodgate | |
| 5,971,559 A | 10/1999 | Ishikawa et al. | |
| 6,014,164 A | 1/2000 | Woodgate et al. | |
| 6,061,489 A | 5/2000 | Ezra et al. | |
| 6,075,557 A | 6/2000 | Holliman et al. | |
| 6,108,059 A | 8/2000 | Yang | |
| 6,144,118 A | 11/2000 | Cahill et al. | |
| 6,199,995 B1 | 3/2001 | Umemoto | |
| 6,305,813 B1 | 10/2001 | Lekson et al. | |
| 6,464,365 B1 | 10/2002 | Gunn et al. | |
| 6,663,254 B2 | 12/2003 | Ohsumi | |
| 6,847,488 B2 | 1/2005 | Travis | |
| 6,870,671 B2 | 3/2005 | Travis | |
| 6,883,919 B2 | 4/2005 | Travis | |
| 7,052,168 B2 | 5/2006 | Epstein et al. | |
| 7,058,252 B2 | 6/2006 | Woodgate | |
| 7,073,933 B2 | 7/2006 | Gotoh et al. | |
| 7,101,048 B2 | 9/2006 | Travis | |
| 7,136,031 B2 | 11/2006 | Lee et al. | |
| 7,215,415 B2 | 5/2007 | Maehara | |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,660,047 B1 | 2/2010 | Travis et al. | |
| 7,750,981 B2 | 7/2010 | Shestak | |
| 7,750,982 B2 | 7/2010 | Nelson | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,216,405 B2 | 7/2012 | Emerton | |
| 8,223,296 B2 | 7/2012 | Lee et al. | |
| 8,325,295 B2 | 12/2012 | Sugita | |
| 8,354,806 B2 | 1/2013 | Travis | |
| 8,477,261 B2 | 7/2013 | Travis | |
| 8,534,901 B2 | 9/2013 | Panagotacos | |
| 8,556,491 B2 | 10/2013 | Lee | |
| 8,651,725 B2 | 2/2014 | Ie et al. | |
| 8,714,804 B2 | 5/2014 | Kim et al. | |
| 2002/0113866 A1 | 8/2002 | Taniguchi et al. | |
| 2003/0137738 A1 | 7/2003 | Ozawa et al. | |
| 2003/0137821 A1 | 7/2003 | Gotoh et al. | |
| 2004/0108971 A1 | 6/2004 | Waldern et al. | |
| 2004/0170011 A1 | 9/2004 | Kim et al. | |
| 2004/0263968 A1 | 12/2004 | Kobayashi et al. | |
| 2005/0135116 A1 | 6/2005 | Epstein et al. | |
| 2005/0180167 A1 | 8/2005 | Hoelen et al. | |
| 2005/0264717 A1 | 12/2005 | Chien et al. | |
| 2005/0276071 A1 | 12/2005 | Sasagawa et al. | |
| 2006/0132423 A1 | 6/2006 | Travis | |
| 2006/0139447 A1 | 6/2006 | Unkrich | |
| 2006/0158729 A1 | 7/2006 | Vissenberg et al. | |
| 2006/0215129 A1 | 9/2006 | Alasaarela et al. | |
| 2006/0269213 A1 | 11/2006 | Hwang et al. | |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0115552 A1 | 5/2007 | Robinson et al. | |
| 2007/0188667 A1 | 8/2007 | Schwerdtner | |
| 2007/0223252 A1 | 9/2007 | Lee et al. | |
| 2008/0084519 A1 | 4/2008 | Brigham et al. | |
| 2008/0086289 A1 | 4/2008 | Brott | |
| 2008/0128728 A1 | 6/2008 | Nemchuk et al. | |
| 2008/0225205 A1 | 9/2008 | Travis | |
| 2008/0259012 A1 | 10/2008 | Fergason | |
| 2008/0297459 A1 | 12/2008 | Sugimoto et al. | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0067156 A1 | 3/2009 | Bonnett et al. | |
| 2009/0140656 A1 | 6/2009 | Kohashikawa et al. | |
| 2009/0160757 A1 | 6/2009 | Robinson | |
| 2009/0190072 A1 | 7/2009 | Nagata et al. | |
| 2009/0190079 A1 | 7/2009 | Saitoh | |
| 2009/0225380 A1 | 9/2009 | Schwerdtner et al. | |
| 2009/0278936 A1 | 11/2009 | Pastoor et al. | |
| 2010/0053771 A1 | 3/2010 | Travis | |
| 2010/0091254 A1 | 4/2010 | Travis | |
| 2010/0165598 A1 | 7/2010 | Chen et al. | |
| 2010/0177387 A1 | 7/2010 | Travis | |
| 2010/0188438 A1 | 7/2010 | Kang | |
| 2010/0188602 A1 | 7/2010 | Feng | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0278480 A1 | 11/2010 | Vasylyev | |
| 2010/0295930 A1 | 11/2010 | Ezhov | |
| 2010/0300608 A1 | 12/2010 | Emerton et al. | |
| 2011/0032483 A1 | 2/2011 | Hruska et al. | |
| 2011/0044056 A1 | 2/2011 | Travis | |
| 2011/0044579 A1 | 2/2011 | Travis et al. | |
| 2011/0051237 A1 | 3/2011 | Hasegawa et al. | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0221998 A1 | 9/2011 | Adachi et al. | |
| 2011/0242298 A1 | 10/2011 | Bathiche | |
| 2011/0255303 A1 | 10/2011 | Nichol et al. | |
| 2011/0285927 A1 | 11/2011 | Schultz et al. | |
| 2011/0310232 A1 | 12/2011 | Wilson et al. | |
| 2012/0002136 A1 | 1/2012 | Nagata et al. | |
| 2012/0013720 A1 | 1/2012 | Kadowaki et al. | |
| 2012/0127573 A1 | 5/2012 | Robinson et al. | |
| 2012/0243204 A1 | 9/2012 | Robinson et al. | |
| 2013/0101253 A1 | 4/2013 | Popovich et al. | |
| 2013/0135588 A1 | 5/2013 | Popovich et al. | |

FOREIGN PATENT DOCUMENTS

| | | |
|---|---|---|
| CN | 1454329 A | 11/2003 |
| CN | 1823292 A | 8/2006 |
| CN | 1826553 A | 8/2006 |
| EP | 0833183 A1 | 4/1998 |
| EP | 0939273 | 1/1999 |
| EP | 0656555 B1 | 3/2003 |
| EP | 0860729 B1 | 7/2006 |
| EP | 2003394 | 12/2008 |
| JP | 08-237691 A | 9/1996 |
| JP | 08254617 A | 10/1996 |
| JP | 08340556 A | 12/1996 |
| JP | 2000-200049 A | 7/2000 |
| JP | 2001093321 A | 4/2001 |
| JP | 2002049004 A | 2/2002 |
| JP | 2003-215705 A | 7/2003 |
| JP | 2004319364 A | 11/2004 |
| JP | 2005135844 A | 5/2005 |
| JP | 2005183030 | 7/2005 |
| JP | 2005-259361 A | 9/2005 |
| JP | 2006004877 | 1/2006 |
| JP | 2006031941 A | 2/2006 |
| JP | 3968742 B2 | 8/2007 |
| JP | 2008204874 A | 9/2008 |
| KR | 1020030064258 | 7/2003 |
| KR | 10-0932304 B1 | 12/2009 |
| KR | 1020110006773 A | 1/2011 |
| KR | 1020110017918 A | 2/2011 |
| KR | 1020110067534 A | 6/2011 |
| KR | 10-2012-004989 A | 5/2012 |
| KR | 1020120048301 A | 5/2012 |
| TW | 200528780 A | 9/2005 |

(56) References Cited

FOREIGN PATENT DOCUMENTS

| WO | 9406249 A1 | 3/1994 |
|---|---|---|
| WO | 9527915 A1 | 10/1995 |
| WO | 2001-061241 A1 | 8/2001 |

OTHER PUBLICATIONS

International search report and written opinion of international searching authority for co-pending PCT application No. PCT/US2013/041619 mailed Aug. 27, 2013.
International search report and written opinion of international searching authority for co-pending PCT application No. PCT/US2013/041655 mailed Aug. 27, 2013.
International search report and written opinion of international searching authority for co-pending PCT application No. PCT/US2013/041703 mailed Aug. 27, 2013.
International search report and written opinion of international searching authority for co-pending PCT application No. PCT/US2013/041548 mailed Aug. 27, 2013.
International search report and written opinion of international searching authority for co-pending PCT application No. PCT/US2013/041683 mailed Aug. 27, 2013.
International search report and written opinion of international searching authority for co-pending PCT application No. PCT/US2013/041228 mailed Aug. 23, 2013.
International search report and written opinion of international searching authority for co-pending PCT application No. PCT/US2013/041235 mailed Aug. 23, 2013.
International search report and written opinion of international searching authority for co-pending PCT application No. PCT/US2013/041697 mailed Aug. 23, 2013.
International search report and written opinion of international searching authority for PCT application PCT/US2013/063133 mailed Jan. 20, 2014.
International search report and written opinion of international searching authority for PCT application PCT/US2013/063125 mailed Jan. 20, 2014.
International search report and written opinion of international searching authority for PCT application PCT/US2013/077288 mailed Apr. 18, 2014.
International search report and written opinion of international searching authority for PCT application PCT/US2014/017779 mailed May 28, 2014.
Tabiryan et al., "The Promise of Diffractive Waveplates," Optics and Photonics News, vol. 21, Issue 3, pp. 40-45 (Mar. 2010).
International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004).
International search report and written opinion of the international searching authority from PCT/US12/052189 dated Jan. 29, 2013.
International Preliminary Report on Patentability in PCT/US2011/061511 dated May 21, 2013.
13790775.4 European Extended Search Report of European Patent Office dated Oct. 9, 2015 (Previously submitted on Jun. 29, 2016).
201380026050.0 Chinese 1st Office Action of the State Intellectual Property Office of P.R. dated Jun. 3, 2016 (previously submitted on Jun. 29, 2016).

CONTROL SYSTEM FOR A DIRECTIONAL LIGHT SOURCE

CROSS-REFERENCE TO RELATED APPLICATIONS

This application claims priority to U.S. Provisional Patent Application No. 61/649,050, entitled "Control System for a directional light source," filed May 18, 2012, which is herein incorporated by reference in its entirety.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to an aspect of the present disclosure, there may be provided an autostereoscopic display apparatus which may include a display device including a transmissive spatial light modulator. The transmissive spatial light modulator may include an array of pixels arranged to modulate light passing therethrough. The display device may also include a waveguide having an input end and first and second opposed guide surfaces for guiding light along the waveguide. The first and second opposed guide surfaces may extend from the input end across the spatial light modulator. The display device may also include an array of light sources at different input positions in a lateral direction across the input end of the waveguide. The waveguide may be arranged to direct input light, from light sources at the different input positions across the input end, as output light through the first guide surface for supply through the spatial light modulator into respective optical windows in output directions distributed in the lateral direction in dependence on the input positions. The autostereoscopic display apparatus may also include a sensor system which may be arranged to detect the position of an observer relative to the display device and a control system which may be arranged to control the spatial light modulator and the light sources. The control system may be arranged to control the spatial light modulator to modulate light with left and right images temporally multiplexed in left and right image phases that alternate with each other. Additionally, the control system may be arranged to operate the light sources in the left and right image phases, selectively to direct the left and right images into viewing windows which may include at least one optical window in positions corresponding to left and right eyes of an observer, in dependence on the detected position of the observer. The control system may be arranged, when the position of the viewing windows is substantially static, to operate individual light sources over a single phase so that the time-average of luminous flux has a predetermined value. The control system may be arranged, when shifting the position of the viewing windows in response to the detected position of the observer changing, to control light sources corresponding to optical windows of left and right viewing windows that are closest to each other by ceasing operation of a given light source in one of the left and right image phases and starting operation of the same or different light source in the other one of the left and right image phases. This may take place in a manner in which, over each adjacent pair of a left image phase and a right image phase, the time-average of the luminous flux of the given light source and the luminous flux of the same or different light source may be more than zero and less than twice the predetermined value.

By processing the waveforms to the LEDs of the light emitting element illuminator array in the transition regions between left and right phases the conditions that may result in a brightness artifact can be compensated for during observer tracking.

Modifying the LED drive waveforms as described herein may reduce the appearance of a brightness flicker effect for the observer and thus improve the quality of the display for a tracked observer. Further, a waveform may be modified so that the inserted pulse may be arranged temporally approximately equidistant between preceding and following pulses. Such an embodiment may achieve further reduction in appearance of the flicker artifact for a moving observer.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

U.S. Pat. No. 6,377,295, which is herein incorporated by reference in its entirety, generally discusses that prediction can be used to correct coordinates due to latency in tracking control. This is applied to a mechanically moved parallax optical element, the position of which must be controlled at all times or continuously. By way of comparison the present embodiments provide a predictive generation of the observer location, rather than the tracker latency, at a defined future time set by the display illumination pulses. Advantageously it may not be appropriate to determine locations continuously, but instead at discrete future times of the illumination. U.S. Pat. No. 5,959,664, which is herein incorporated by reference in its entirety, generally discusses longitudinal tracking of an observer and steering by adjusting the content of the display SLM. By way of comparison embodiments described below may achieve longitudinal tracking by adjusting the illumination of the optical valve without adjusting or slicing of the image on the display SLM.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
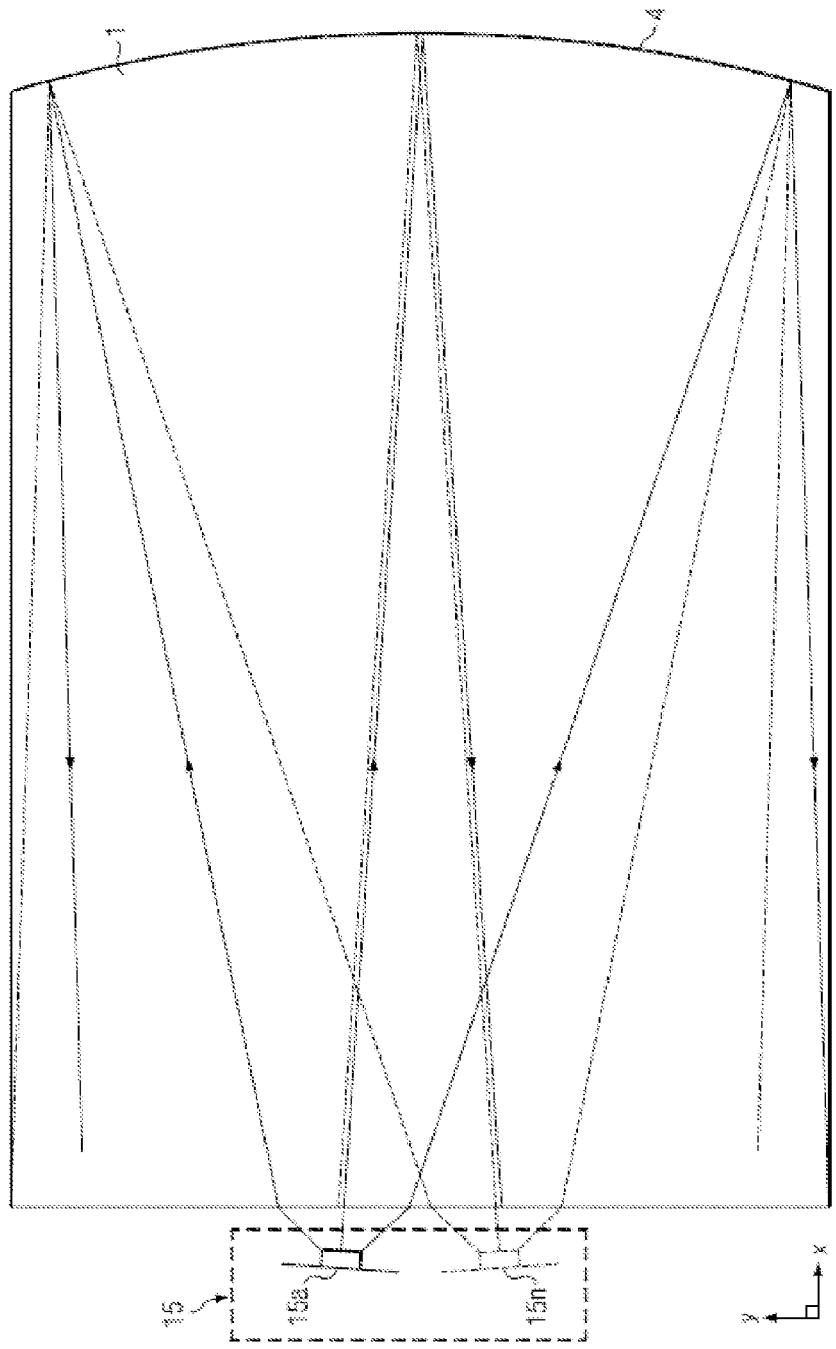
FIG. 1A is a schematic diagram illustrating a front view of light propagation in one embodiment of a directional display device.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight comprising a waveguide for guiding light, which may include a first light guiding surface and a second light guiding surface, opposite the first light guiding surface, further comprising a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a nominal window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
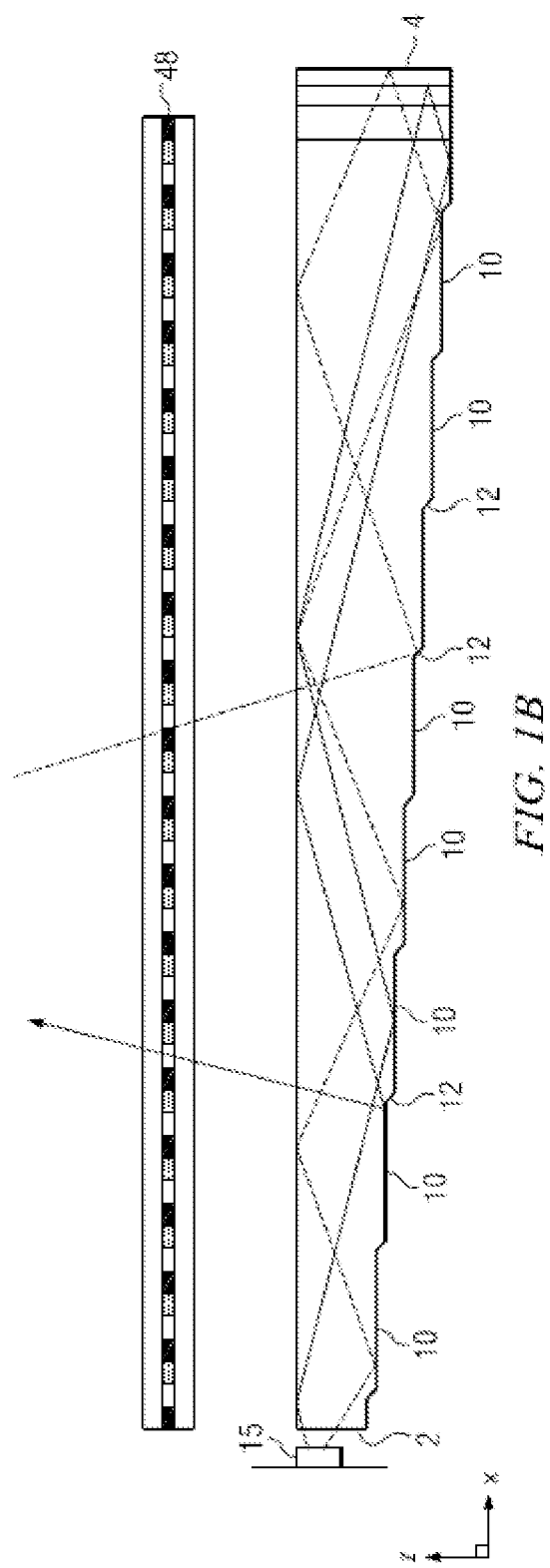
FIG. 1B is a schematic diagram illustrating a side view of light propagation in one embodiment of the directional display device of FIG. 1A.

FIG. 1A is a schematic diagram illustrating a front view of light propagation in one embodiment of a directional display device, and FIG. 1B is a schematic diagram illustrating a side view of light propagation in the optical valve structure of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15*a* through illuminator element 15*n* (where n is an integer greater than one). In one example, the stepped waveguide 1 of FIG. 1A may be a stepped, display sized waveguide 1. Illuminator elements

15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window.

In the present disclosure an optical window may correspond to the image of a single light source in the window plane, being a nominal plane in which optical windows form across the entirety of the display device. Alternatively, an optical windows may correspond to the image of a groups of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

In one embodiment, a display device may include a stepped waveguide or light valve which in turn, may include a first guide surface that may be arranged to guide light by total internal reflection. The light valve may include a second guide surface which may have a plurality of light extraction features inclined to reflect light guided through the waveguide in directions allowing exit through the first guide surface as the output light. The second guide surface may also have regions between the light extraction features that may be arranged to direct light through the waveguide without extracting it.

In another embodiment, a display device may include a waveguide with at least a first guide surface which may be arranged to guide light by total internal reflection and a second guide surface which may be substantially planar and inclined at an angle to reflect light in directions that break the total internal reflection for outputting light through the first guide surface, The display device may include a deflection element extending across the first guide surface of the waveguide for deflecting light towards the normal to the SLM 48.

In yet another embodiment, a display device may include a waveguide which may have a reflective end facing the input end for reflecting light from the input light back through the waveguide. The waveguide may further be arranged to output light through the first guide surface after reflection from the reflective end.

Figure 2A:
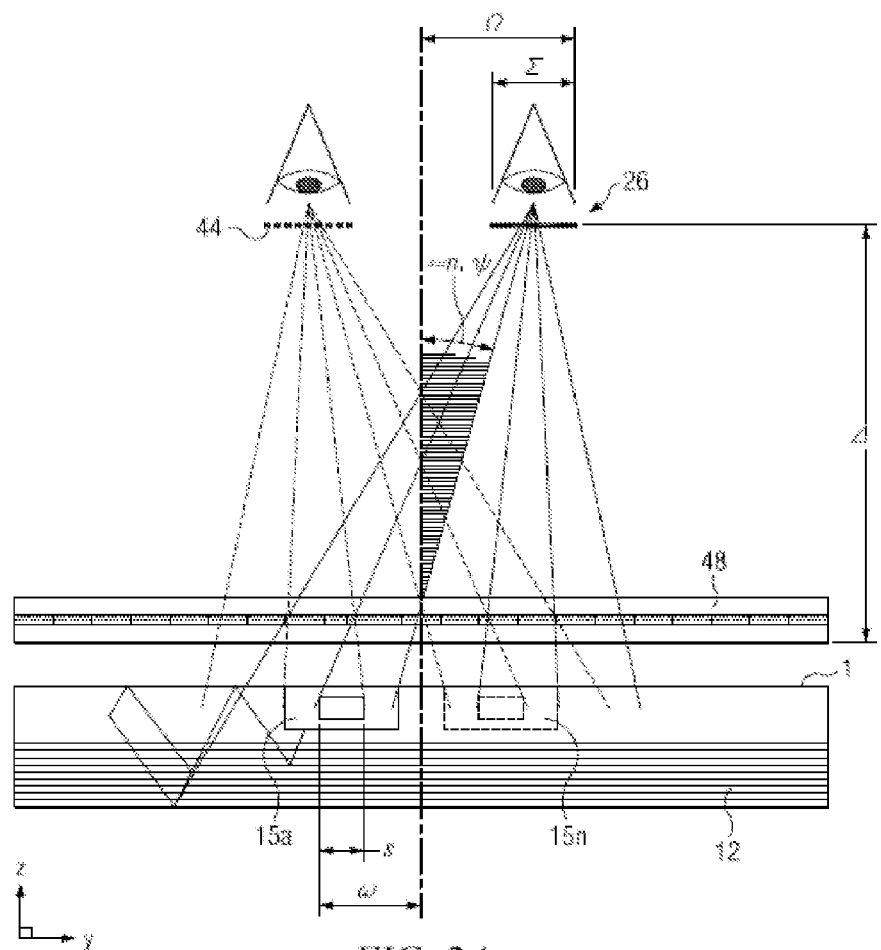
FIG. 2A is a schematic diagram illustrating in a top view of light propagation in another embodiment of a directional display device.
Figure 2B:
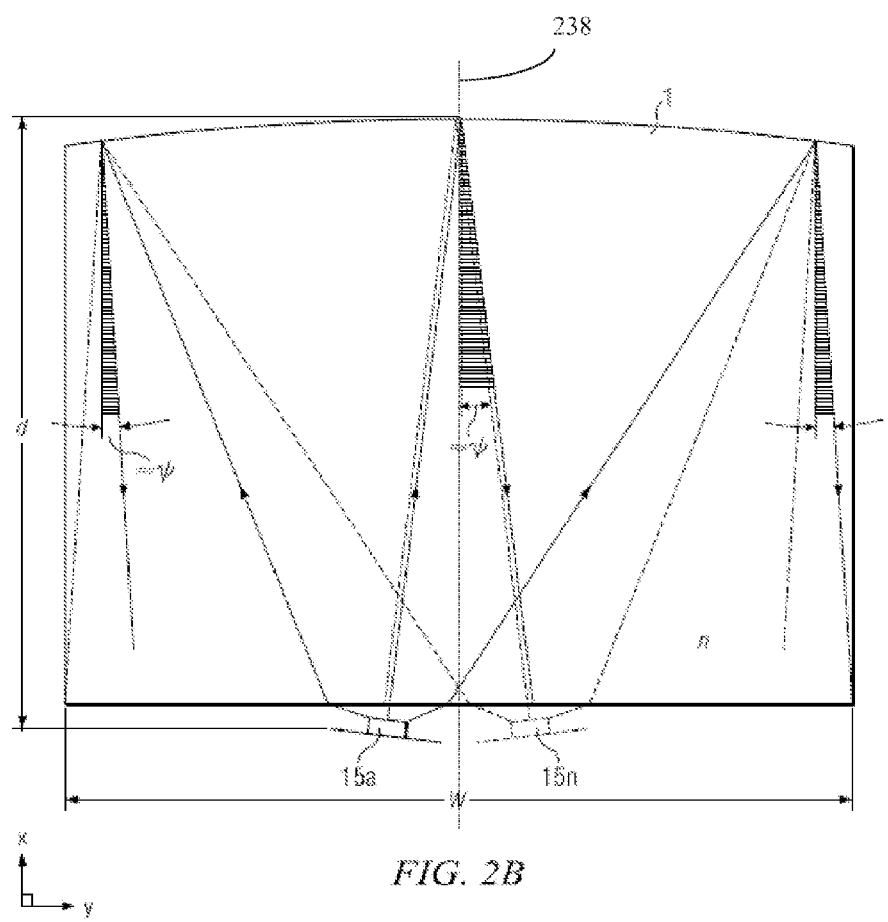
FIG. 2B is a schematic diagram illustrating light propagation in a front view of the directional display device of FIG. 2A.
Figure 2C:
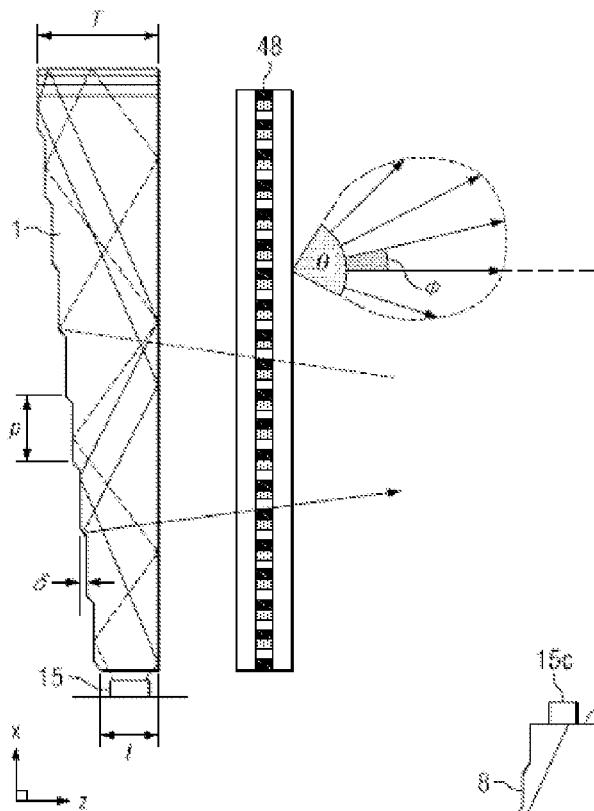
FIG. 2C is a schematic diagram illustrating light propagation in a side view of the directional display device of FIG. 2A.

Illuminating an SLM 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the centre of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
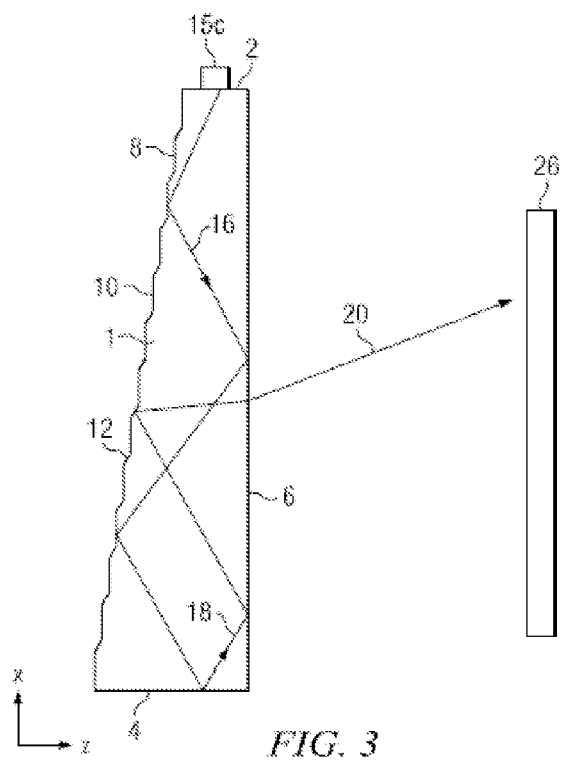
FIG. 3 is a schematic diagram illustrating in a side view of a directional display device.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the SLM 48 that intersect with a plane at the nominal viewing distance.

Figure 4A:
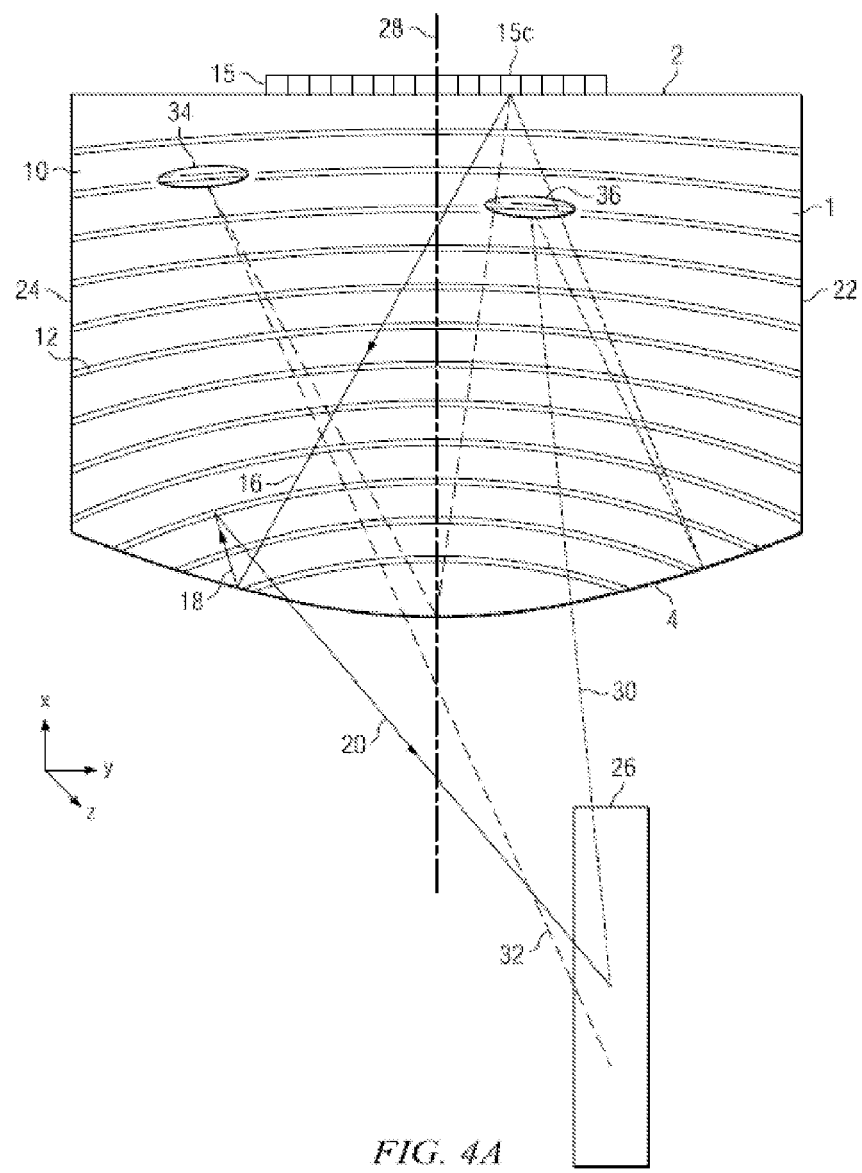
FIG. 4A is schematic diagram illustrating in a front view, generation of a viewing window in a directional display device and including curved light extraction features.

FIG. 4A is a schematic diagram illustrating in front view a directional display device which may be illuminated by a first illuminator element and including curved light extraction features. In FIG. 4A, the directional backlight may include the stepped waveguide 1 and the light source illuminator array 15. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
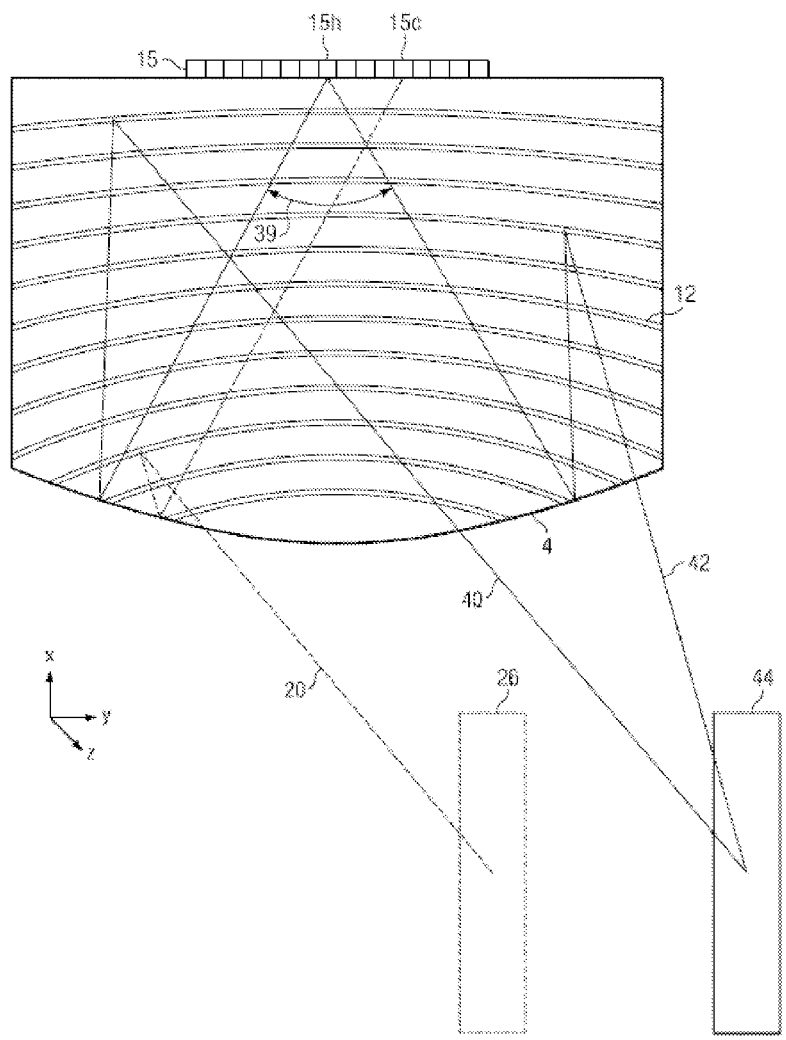
FIG. 4B is a schematic diagram illustrating in a front view, generation of a first and a second viewing window in a directional display device and including curved light extraction features.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
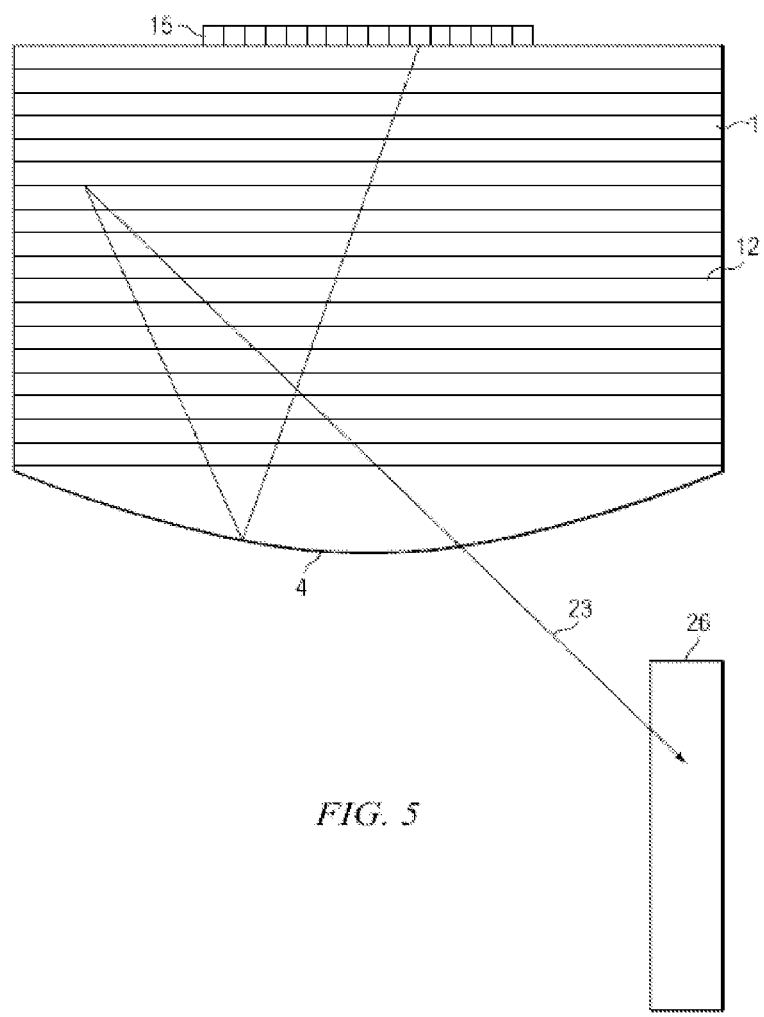
FIG. 5 is a schematic diagram illustrating generation of a first viewing window in a directional display device including linear light extraction features.

FIG. 5 is a schematic diagram illustrating in front view an embodiment of a directional display device comprising a waveguide 1 having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
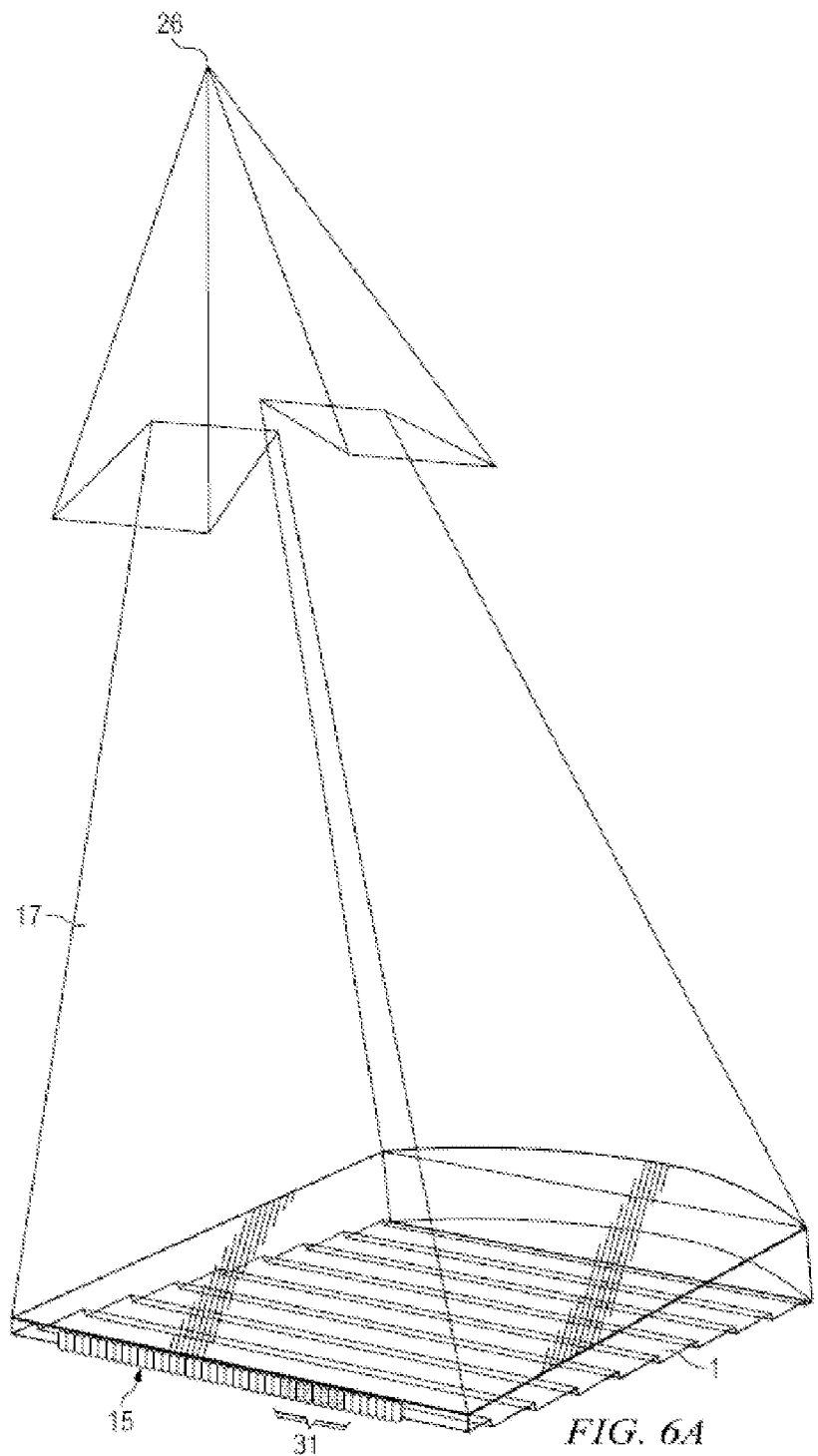
FIG. 6A is a schematic diagram illustrating one embodiment of the generation of a first viewing window in a time multiplexed imaging directional display device in a first time slot.
Figure 6B:
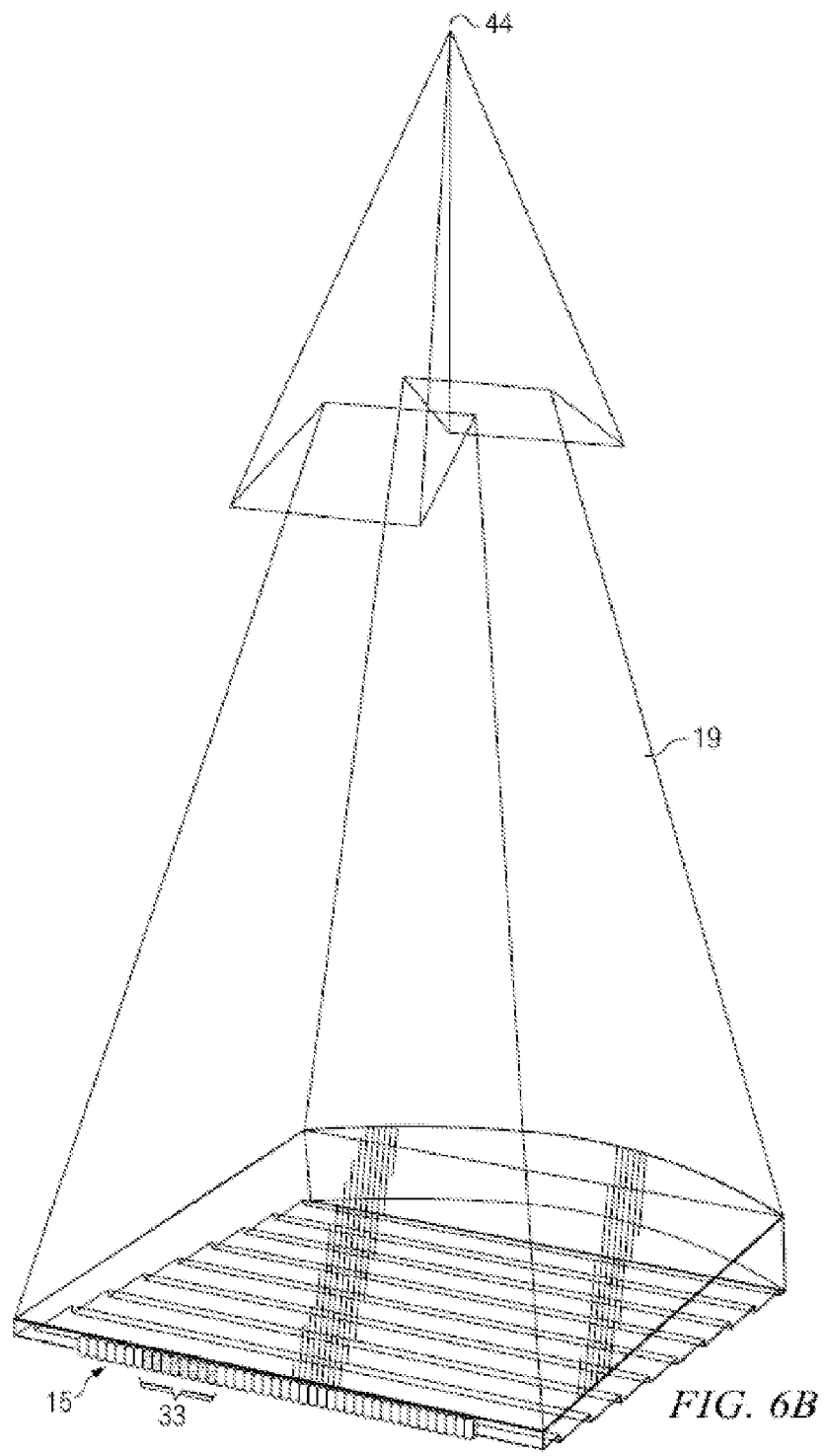
FIG. 6B is a schematic diagram illustrating another embodiment of the generation of a second viewing window in a time multiplexed directional display device in a second time slot.
Figure 6C:
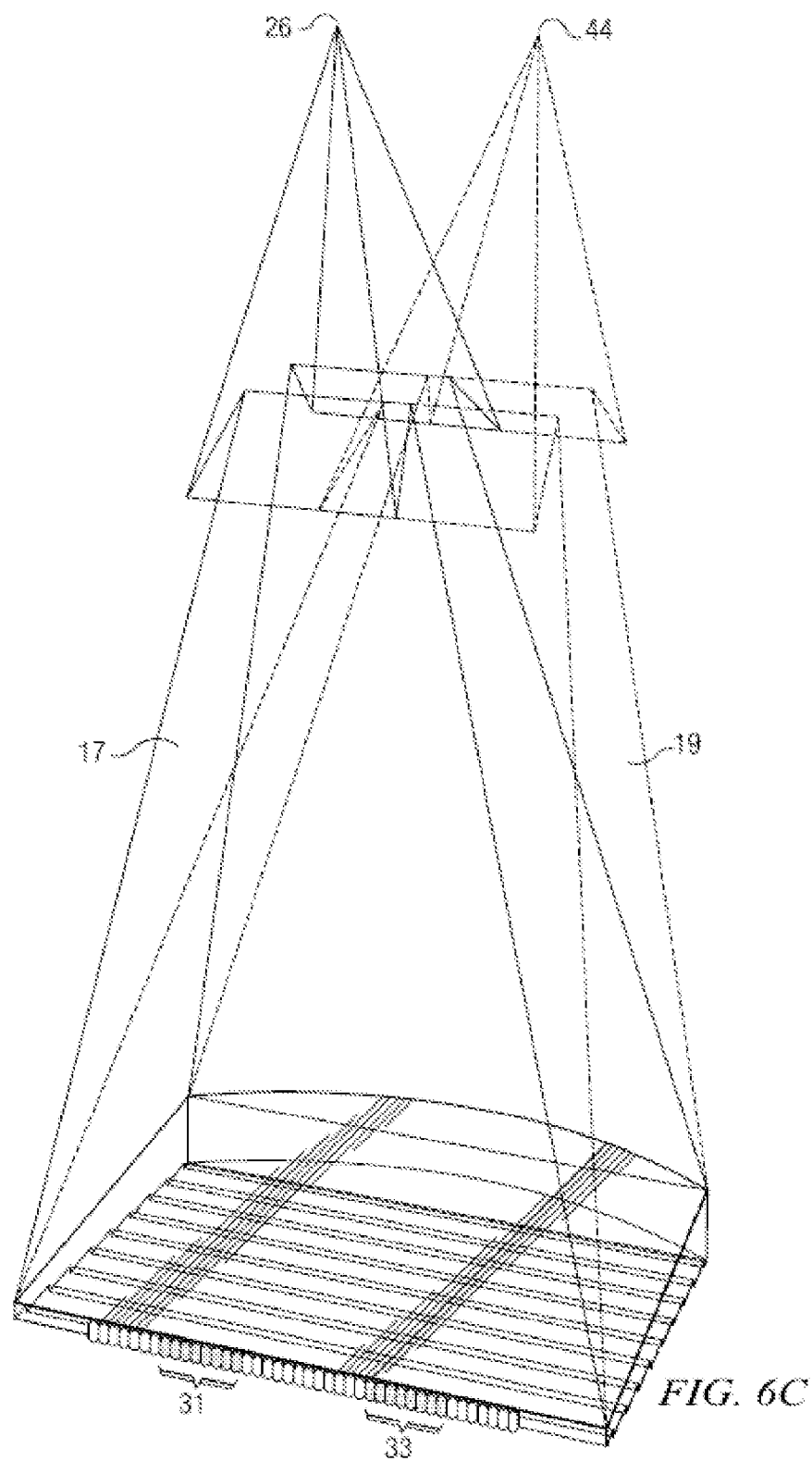
FIG. 6C is a schematic diagram illustrating another embodiment of the generation of a first and a second viewing window in a time multiplexed directional display device.

FIG. 6A is a schematic diagram illustrating one embodiment of the generation of a first viewing window in a time multiplexed imaging directional display device, namely an optical valve apparatus in a first time slot. FIG. 6B is a schematic diagram illustrating another embodiment of the generation of a second viewing window in a time multiplexed imaging directional backlight apparatus in a second time slot. FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a SLM 48 (not shown in FIGS. 6A, 6B, 6C) is adjusted in correspondence with the light direction output, then an autostereoscopic image may be achieved for a suitably placed viewer. Similar operation can be achieved with all the directional backlights and directional display devices described herein. Note that illuminator element groups 31, 33 each include one or more illumination elements from illumination elements 15a to 15n, where n is an integer greater than one.

Figure 7:
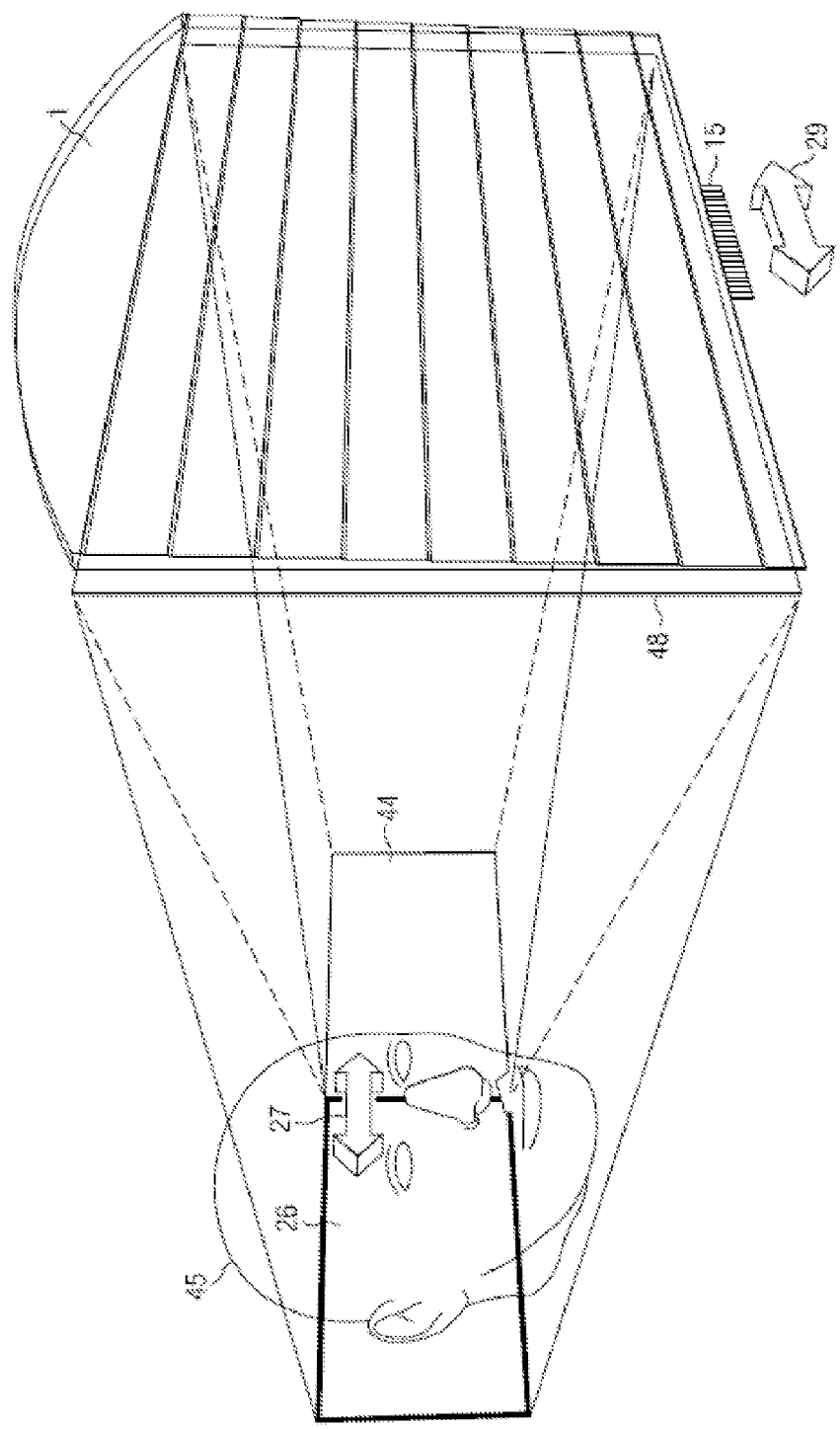
FIG. 7 is a schematic diagram illustrating an observer tracking autostereoscopic display apparatus including a time multiplexed directional display device.

FIG. 7 is a schematic diagram illustrating one embodiment of an observer tracking autostereoscopic directional display device including a time multiplexed directional backlight. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights and directional display devices described herein.

Figure 8:
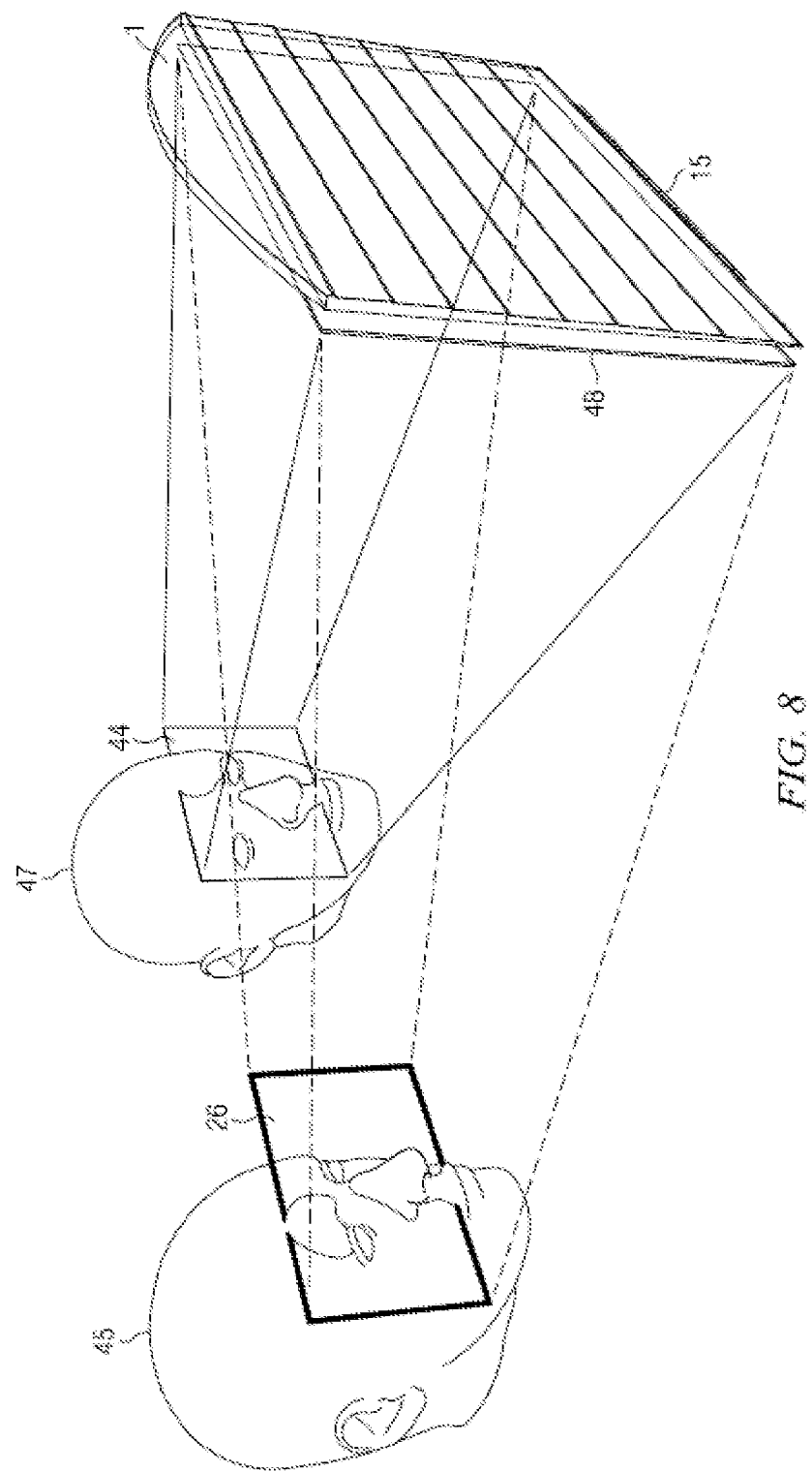
FIG. 8 is a schematic diagram illustrating a multi-viewer directional display device.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the SLM 48. The two 2D images of FIG. 8 may be generated in a similar manner as described with respect to FIG. 7 in that the two images would be displayed in sequence and in synchronization with sources whose light is directed toward the two viewers. One image is presented on the SLM 48 in a first phase, and a second image is presented on the SLM 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
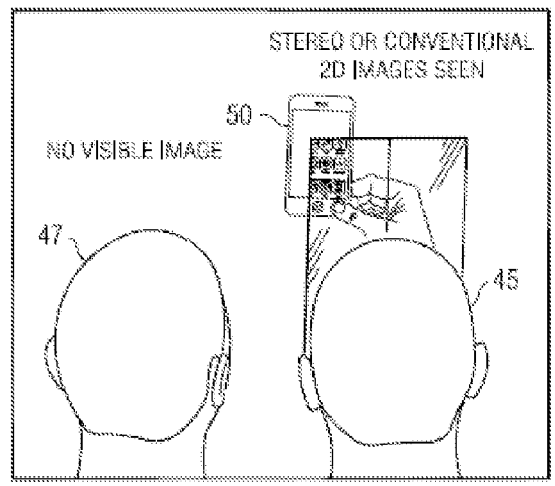
FIG. 9 is a schematic diagram illustrating a privacy directional display device.

FIG. 9 is a schematic diagram illustrating a privacy directional display device which includes an imaging directional backlight. 2D image display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
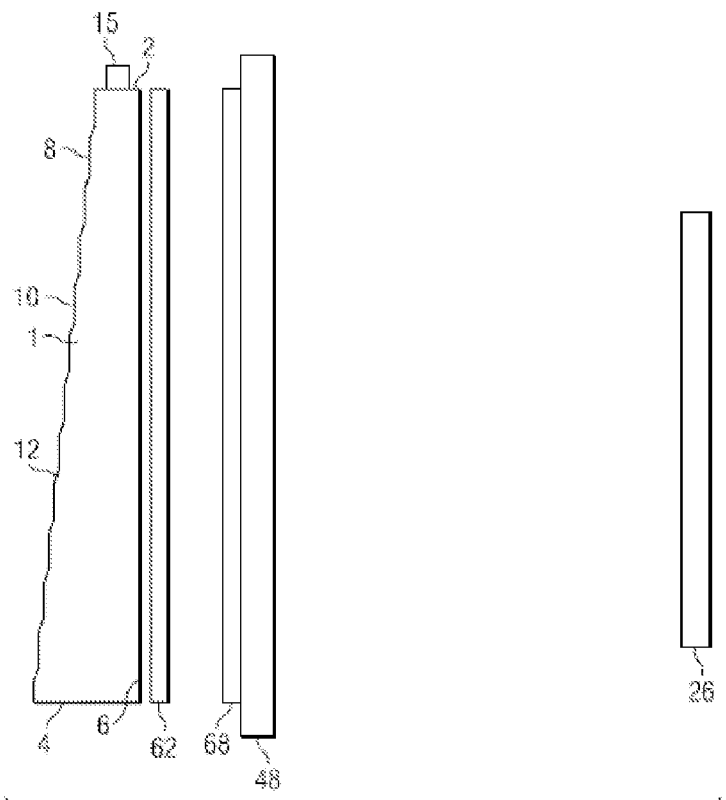
FIG. 10 is a schematic diagram illustrating in side view, the structure of a time multiplexed directional display device.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the SLM 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and SLM 48 arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 11A:
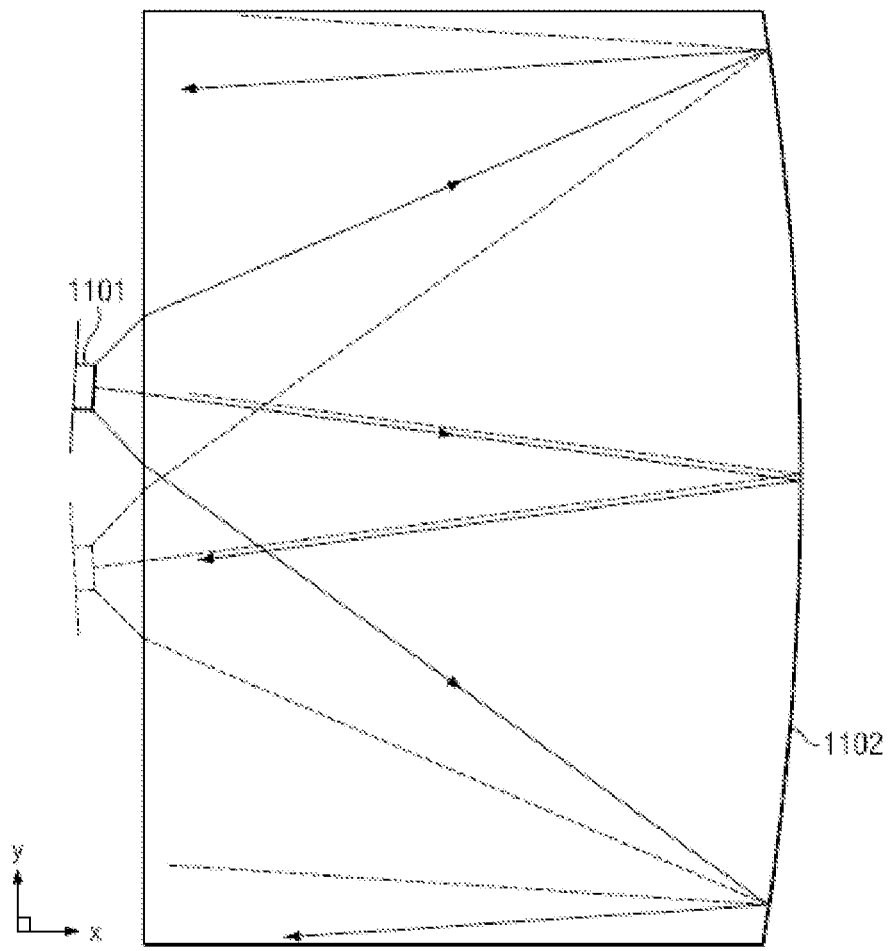
FIG. 11A is a schematic diagram illustrating a front view of a wedge type directional backlight.
Figure 11B:
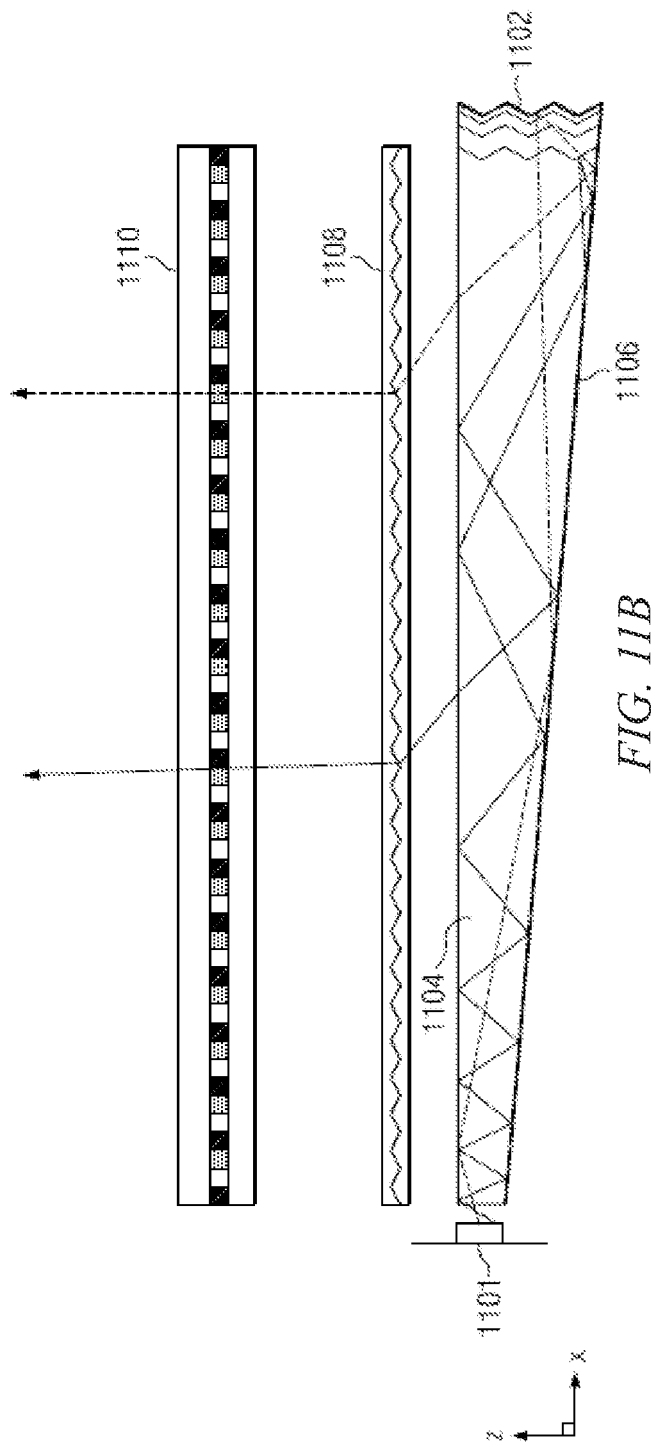
FIG. 11B is a schematic diagram illustrating a side view of a wedge type directional backlight.

FIG. 11A is a schematic diagram illustrating a front view of another imaging directional display device, as illustrated, a wedge type directional backlight, and FIG. 11B is a schematic diagram illustrating a side view of the same wedge type directional display device. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106. As shown in FIG. 11B, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There follows a description of some directional display apparatuses including a directional display device and a control system, wherein the directional display device includes a directional backlight including a waveguide and an SLM. In the following description, the waveguides, directional backlights and directional display devices are based on and incorporate the structures of FIGS. 1 to 11B above. Except for the modifications and/or additional features which will now be described, the above description applies equally to the following waveguides, directional backlights and display devices, but for brevity will not be repeated.

Figure 12:
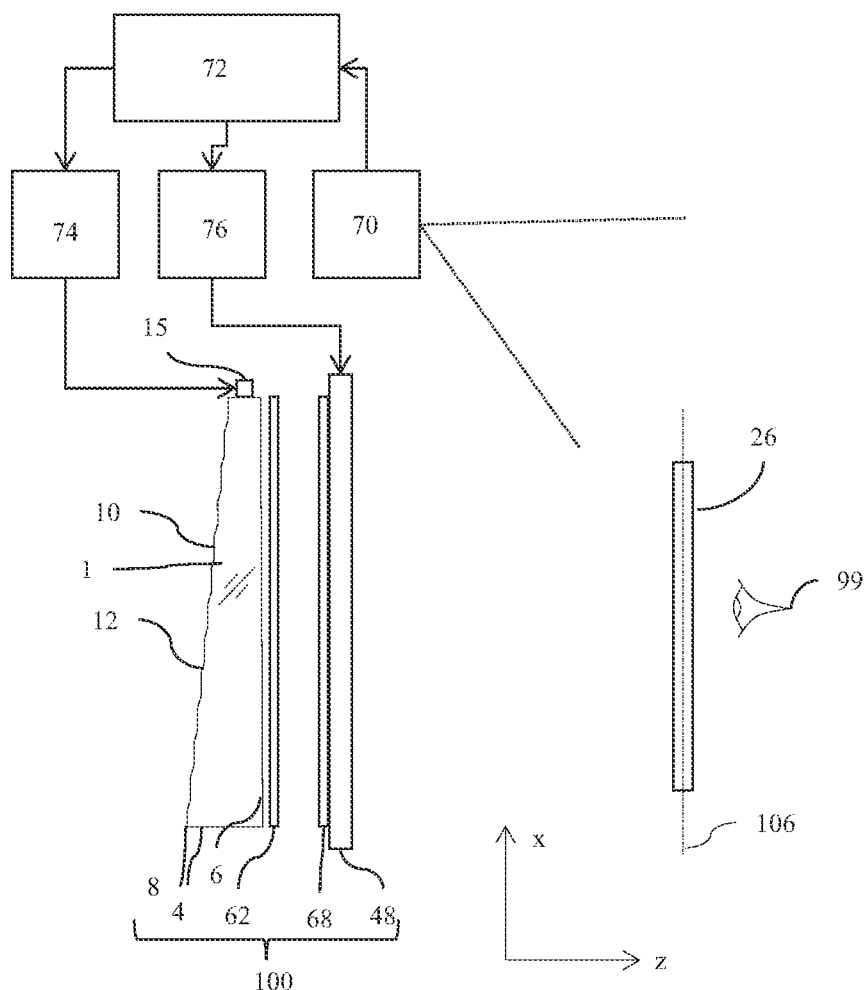
FIG. 12 is a schematic diagram illustrating a directional display apparatus comprising a display device and a control system.

FIG. 12 is a schematic diagram illustrating a directional display apparatus comprising a display device 100 and a control system. The arrangement and operation of the control system will now be described and may be applied, mutatis mutandis, to each of the display devices disclosed herein. As illustrated in FIG. 12, a directional display device 100 may include a directional backlight device that may itself include a stepped waveguide 1 and a light source illuminator array 15. As illustrated in FIG. 12, the stepped waveguide 1 includes a light directing side 8, a reflective end 4, guiding features 10 and light extraction features 12. The directional display device 100 may further include an SLM 48.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive SLM 48 may be arranged to receive the light from the directional backlight. Further a diffuser 68 may be provided to substantially remove Moire beating between the waveguide 1 and pixels of the SLM 48 as well as the Fresnel lens structure62.

The control system may comprise a sensor system arranged to detect the position of the observer 99 relative to the display device 100. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into respective viewing windows in positions corresponding to the left and right eyes of an observer synchronously with the display of left and right eye images. In this manner, an autostereoscopic effect is achieved using a time division multiplexing technique.

Figure 13:
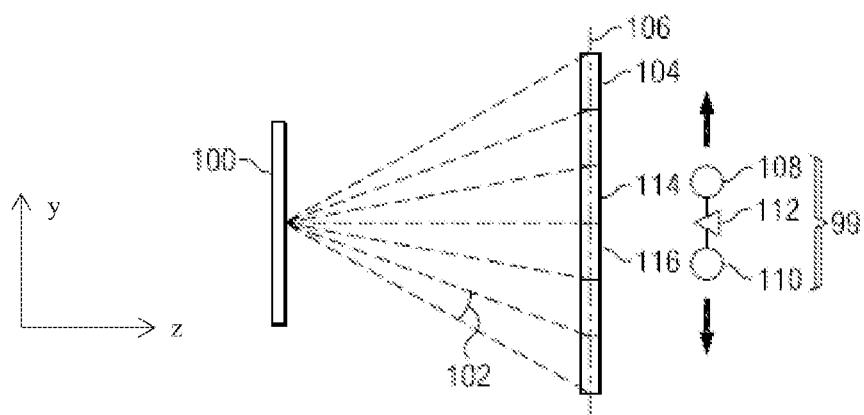
FIG. 13 is a schematic diagram illustrating in top view, the formation of viewing windows.

FIG. 13 is a schematic diagram illustrating in front view, the formation of viewing windows. Further, FIG. 13 shows in top view, the embodiment of FIG. 12. Display 100 may produce a fan of light cones 102 and an array of viewing windows 104 in the window plane 106, being a nominal plane. An observer 99 with nose location 112 may see illumination from display 100. When a left eye 110 is approximately aligned with window 116 and a right eye 108 is approximately aligned with window 114 and image data presented in windows 114 and 116 is a stereo pair, then an autostereoscopic 3D image may be perceived by the observer. The windows 114 and 116 may alternatively show substantially the same data so the display device 100 may function in as a 2D image display device. The windows 114 and 116 may be illuminated in separate time slots in synchronization with the display on the panel of left and right eye image data.

There will now be described various arrangements of viewing windows. Each of these may be provided by appropriate operation of the control system as described above, for example by selectively operating the illuminator elements 15 to direct light to into the viewing windows 26 in synchronization with the display of images on the SLM 48. The directional display apparatus may be operable to provide any one of these viewing window arrangements, or any combination of these viewing window arrangements at the same or different times, for example in different modes of operation of the directional display apparatus.

In the various drawings illustrating arrangements of viewing windows, the structure of optical windows illustrates the nominal position of the optical windows rather than the actual light distributions which may take a variety of forms and may overlap.

Figure 14A:
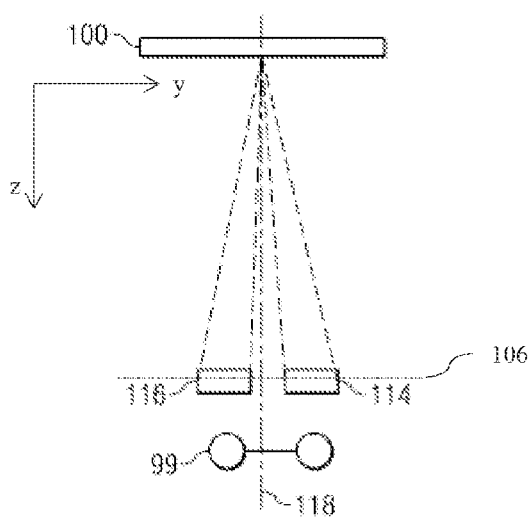
FIG. 14A is a schematic diagram illustrating in front view, a first viewing window arrangement.
Figure 14B:
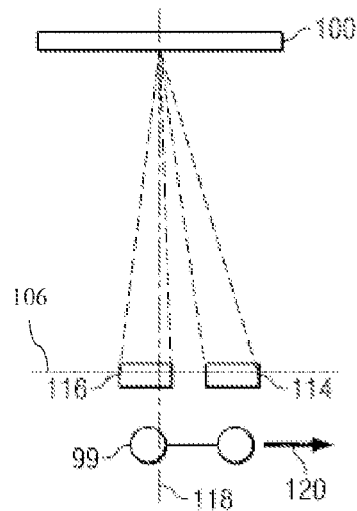
FIG. 14B is a schematic diagram illustrating in front view, a second viewing window arrangement for a moving observer.

FIG. 14A is a schematic diagram illustrating in front view, a first viewing window arrangement. Further, FIG. 14A shows in front view, the embodiment of FIG. 12. The observer 99 is illustrated as slightly to the right of a plane 118 normal to the approximate center of the display 100. Accordingly left and right eye viewing windows 114, 116 may be generated slightly to the right of the display. In FIG. 14B the observer 99 is illustrated as being repositioned in direction 120 to the right and so windows 114, 116 may be steered to the right in response. FIG. 14B is a schematic diagram illustrating in front view, a second viewing window arrangement for a moving observer. Advantageously the left and right eyes of the observer may be illuminated with left and right eye image data during observer movement.

Window movement may be provided by mechanical movement of the illuminator array 15 in correspondence with observer 99 movement in the window plane 106. However, such movement is complicated and expensive. It is thus desirable to achieve a reduction in the cost and complexity of movement of illuminator elements of illuminator array 15 through switching of discrete illuminator elements, under the control of the control system.

Figure 15:
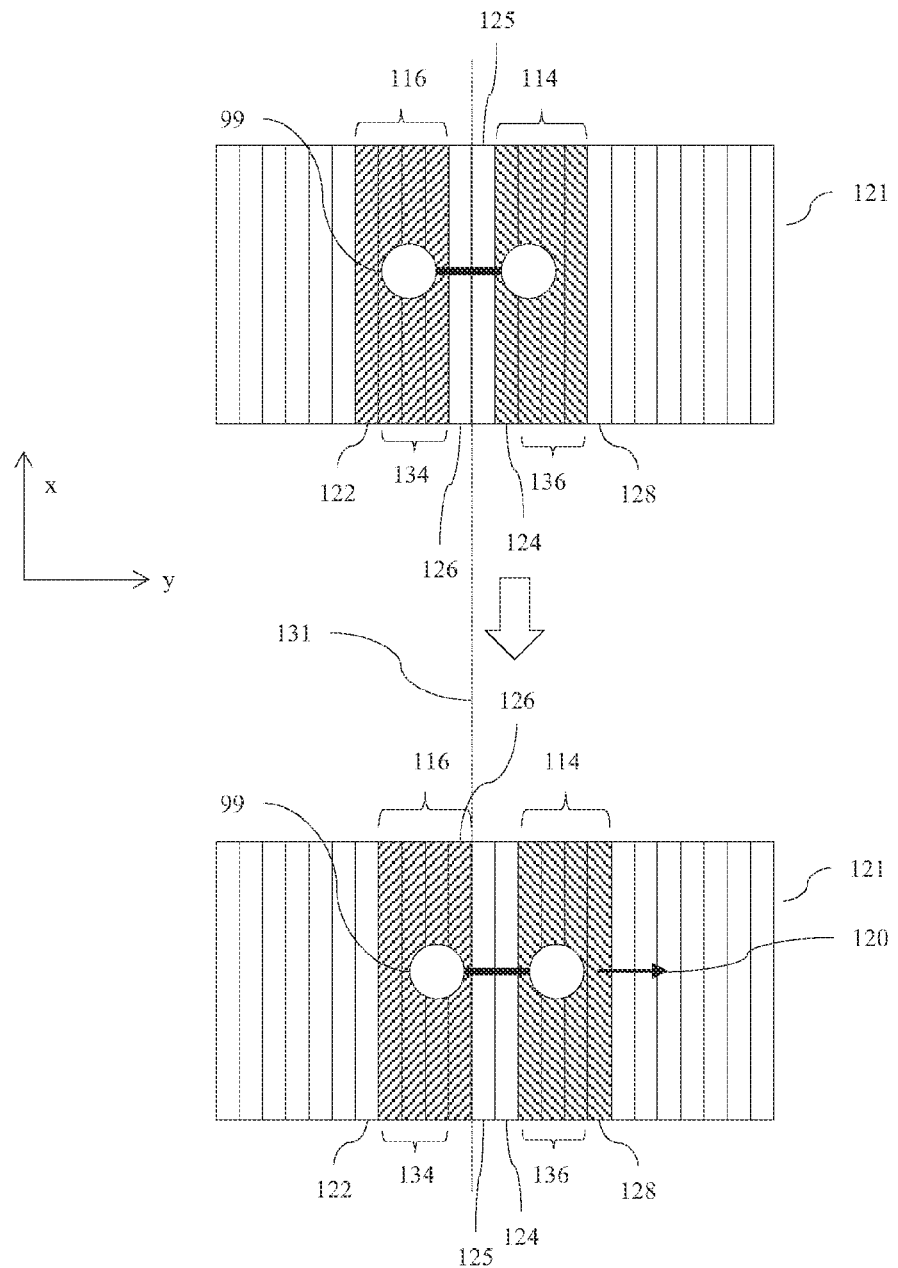
FIG. 15 is a schematic diagram illustrating the appearance of windows of FIG. 14A in the window plane during observer movement.

FIG. 15 is a schematic diagram illustrating the appearance of windows of FIG. 14A in the window plane 106 for first and second tracked observer positions. Further, FIG. 15 shows schematically an array 121 of optical windows (that may also be referred to as sub-windows) which may be arranged to achieve a switchable array of viewing windows. Each optical window of the array 121 may correspond to the image in the window plane 106 such as shown in FIGS. 12 and 13 of an illuminator element of the illuminator array 15, as described above.

The illuminated structure of an optical window array 121 in the window plane 106 may approximately correspond to the lateral location of observer 99 as shown in FIG. 14A. In the present embodiment viewing window 116 for the left eye may include optical window 122 and the optical window array 134. The right eye viewing window 114 may include optical window 124 and optical window array 136. Optical windows 125, 126 and 128 may not be illuminated, so that the respective illuminator elements may not be illuminated.

Further, FIG. 15 shows the detail of the optical window array 121 approximately corresponding to the location of observer 99 as shown in FIG. 14B after movement in direction 120. Window boundary 131 is marked to show the relative position of illuminated optical windows. The left eye viewing window 116 may be arranged to include optical window 126 and optical window array 134. Thus, optical window 122 may be turned off. Similarly for the right eye viewing window, optical window 128 may be turned on and optical window 124 may be turned off, so that the right eye viewing window 114 is arranged to include optical window 128 and optical window array 136. Window 125 remains non-illuminated for the observer movement shown, reducing cross talk.

Advantageously such an embodiment may turn off optical windows away from the eyes of the observer so that as the observer 99 moves the appearance of a display device 100 with greatly enhanced viewing freedom may be achieved. Optical windows, such as optical window 125 which may approximately correspond to locations between the eyes for example, may be turned off to improve the crosstalk of the display images. Low crosstalk advantageously may increase the perceived quality of 3D stereoscopic images.

Further the observer location in two or three dimensions and motion characteristics, such as velocity, acceleration, direction, and head orientation may be determined from the sensor 70 and control unit 72. This in turn may be used to generate the likely observer eye locations in a future illumination time slot. Thus the appropriate illuminated structure of the array 121 of optical windows may be determined to optimize the output directionality of light from the display 100 in a given illumination time slot, and may be determined by setting the illumination structure of the respective illuminator elements of illuminator array 15 for the time slot. Further, the image data on the SLM 48 may be adjusted to advantageously achieve a look-around function, a two dimensional image or other image characteristics as described herein.

Figure 16:
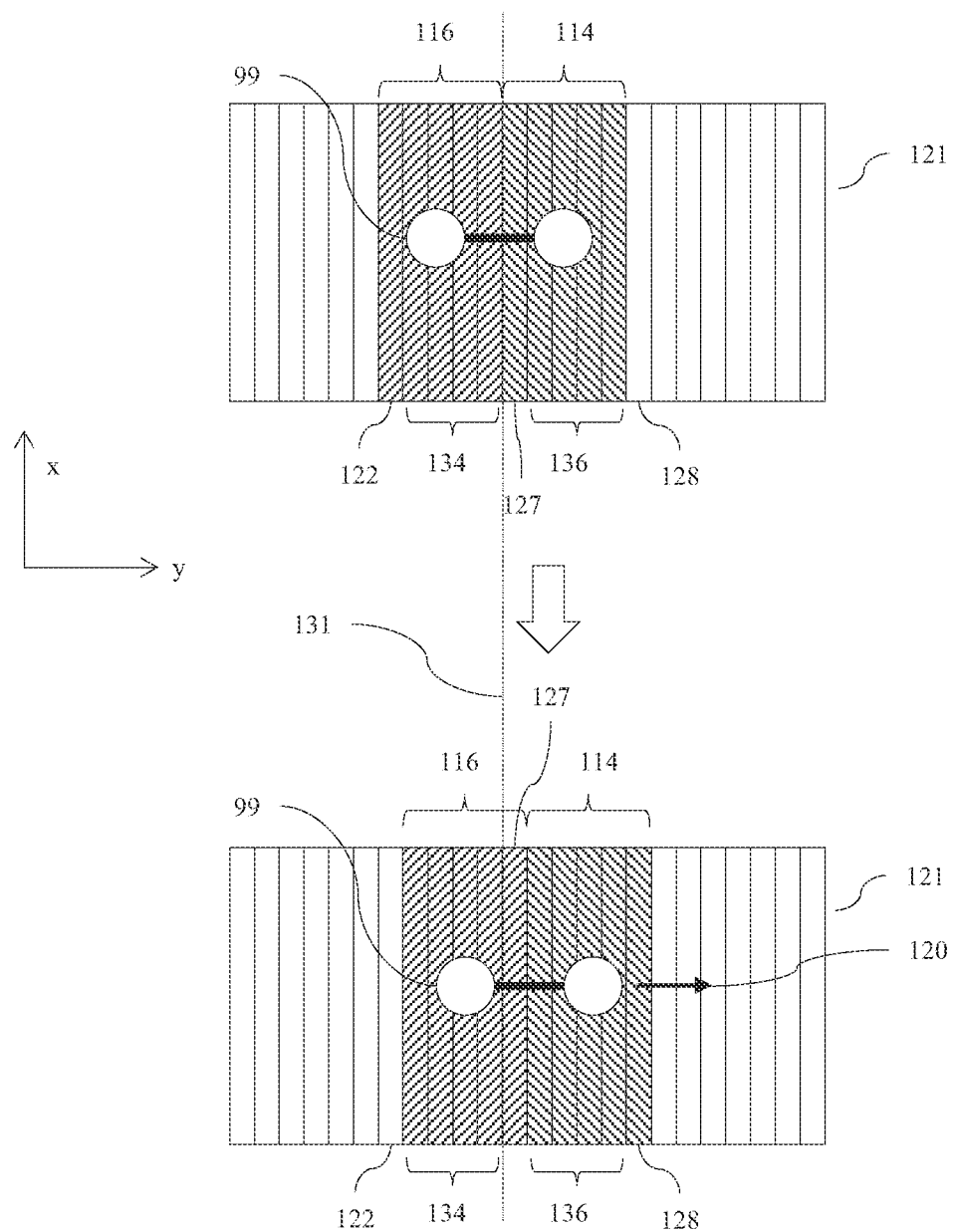
FIG. 16 is a schematic diagram illustrating the appearance of further viewing windows in the window plane during observer movement.

FIG. 16 is a schematic diagram illustrating the appearance of further viewing windows in the window plane during observer movement. In comparison to FIG. 15, optical windows between the eyes of the observer 99 may be illuminated for all observer positions. During tracking of a moving observer, optical window 127 may change from a left eye optical window to a right eye optical window. Advantageously increasing the number of illuminated optical windows between the eyes of the observer may reduce the flicker of images seen by the moving observer 99, particularly for regions at the edge of the illuminated SLM 48 and for observer positions away from the window plane 106. The appearance of image flicker may be a more noticeable image degradation artefact than the improvement in cross talk that may be achieved by non-illuminated interaxial optical windows 125.

In the temporally multiplexed embodiments of the present disclosure, as shown in FIG. 16, the optical window 127 changes from a left eye phase to a right eye phase. Such a change may create undesirable flicker as will be described.

There will now be described aspects of the control effected by the control system described above that may be implemented in the display apparatuses described herein.

Figure 17:
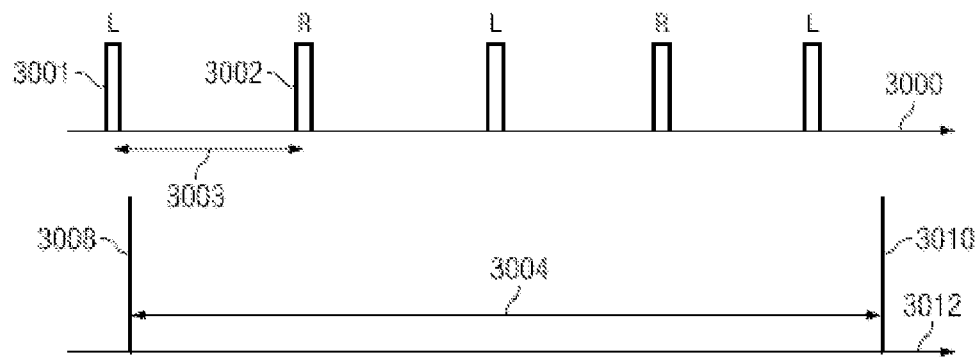
FIG. 17 is a schematic diagram illustrating the timing of illumination phases and observer location updates.

FIG. 17 is a schematic diagram illustrating the timing of illumination phases and observer location updates in the control system under particular conditions. In particular, FIG. 17 shows the form of control signals supplied by the control system to the illuminator elements, taking the following form. Illumination pulses 3001 are supplied during a left image phase to the illuminator elements selected to direct light into a left eye viewing window. Similarly, illumination pulses 3002 are supplied during a right image phase to the illuminator elements selected to direct light into a right eye viewing window. The left image phase and right image phase may have equal periods.

Further, FIG. 17 shows an embodiment where the display device may be provided with, for example, an SLM that is an LCD running at 120 Hz with alternating left and right eye image views. In this embodiment for a given illuminator element of the array 15, the illumination pulses 3001, 3002 on time axis 3000 may be shorter than the full field time 3003 of the display to illuminate substantially the whole display when the LCD panel is substantially fully responded. In this embodiment it may be understood that the location of the observer's left or right eye may be employed at the time of the corresponding illumination pulse. Thus, the steering system 74 in FIG. 12 may illuminate the observer's eye while minimizing flicker and crosstalk. It may also be understood that the tracking system sensor 70 in FIG. 12 may be embodied as a video camera that may produce image frame updates 3008, 3010 separated in time 3004 in time axis 3012, and at a rate less than the display field rate 3003. In this case the controller 72 in FIG. 12 may use previous locations and the time of those locations in order to determine the motion parameters of the observer such as velocity and acceleration. Furthermore this data may be used to predict the location of the observer at future times.

As discussed herein, the full field time may be referred to as the time interval between addressing of a pixel of the temporally multiplexed spatial light modulator in a sequential addressing scheme. The illuminator elements may be arranged to be illuminated in synchronization with the addressing of the spatial light modulator so in normal operation (other than for illuminator elements associated with change of illumination phase), the full field time is for example the time between respective switch on points for the respective illuminator elements in adjacent illumination intervals. As normal in display devices, the field time is selected to be sufficiently short to minimize flicker in normal operation, due to the persistence of vision.

Advantageously this embodiment may provide observer locations at more times than produced by the tracking sensor 70 itself.

Advantageously the predicted locations may be used in cooperation with the tracking sensor and controller 70, 72 of FIG. 12, to localize the image frame search area and thereby reduce the amount of data to be processed or searched in order to determine the location of the observer in the image frame from the sensor 70.

Figure 18:
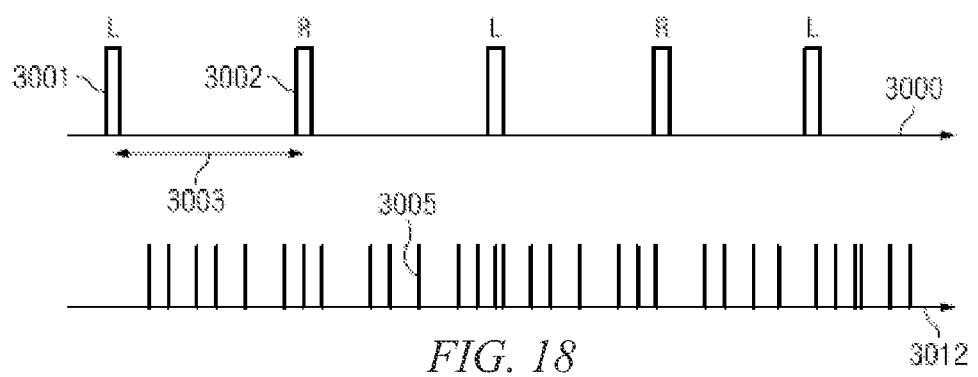
FIG. 18 is a schematic diagram illustrating the timing of illumination phases and asynchronous observer location updates.

FIG. 18 is a schematic diagram illustrating the timing of illumination phases and asynchronous observer location updates of the control system under different conditions. Further, FIG. 18 shows an embodiment in which the observer's location may be generated or calculated at times 3005 and at one or preferably more times within any display field time 3003.

Advantageously this may achieve an embodiment in which the tracking system may update the observer location to the steering system frequently so that when an illumination pulses 3001, 3002 occur there may be a reduction in error compared to only using updates separated in time 3004. It may be readily understood that the more frequent the updates 3005, the lower the observer's location error at the illumination time 3001, 3002. It may also be understood that the tracking and location generating system may not need to be synchronized to the image display system 76 or illumination 74. Note that generating may refer to generating or calculating locations in time rather than in space.

Figure 19:
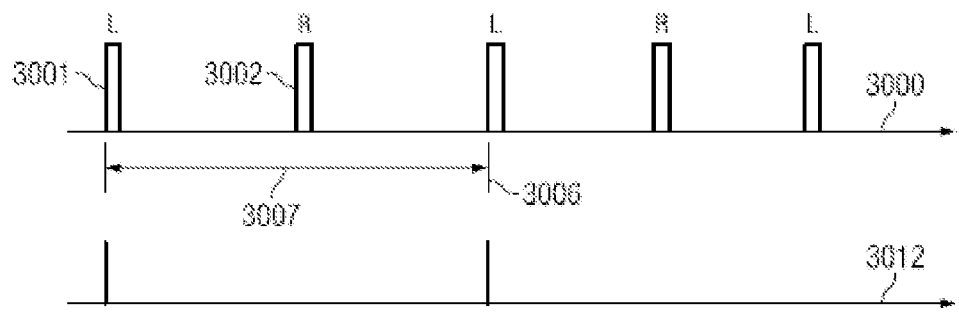
FIG. 19 is a schematic diagram illustrating the timing of illumination phases and synchronous observer location updates.

FIG. 19 is a schematic diagram illustrating the timing of illumination phases; and synchronous observer location updates of the control system under other different conditions. Further, FIG. 19 differs from the embodiment of FIG. 18 in that the location updates on time axis 3012 from the tracking system 70, 72 may be substantially synchronized to the display addressing 76, and the steering and illumination system 74. Advantageously this means that many less extrapolated locations 3006 on time axis 3000 may be needed than in the embodiment FIG. 18 and that observer location accuracy error may be reduced. Advantageously the whole time period 3007 is available for the tracking system 70, 72 to provide a generated location at time 3006.

In the embodiment of FIGS. 18 and 19 it may also be understood that the control system 72 may compare the generated observer location for a future time with the actual location subsequently determined at or near that time in order to produce an error value. The magnitude of this error value may be used by the system as a measure of the "degree of tracking lock" and the system may take actions based on this value including but not limited to changing the size or nature of the illumination in the optical window array 121 in FIG. 15. The illumination in the optical window array 121 may be switched in to 2D mode for example. Note that this action may take place at any point in the viewable field, not just at the extremes.

The sensor, for example a video camera, may be calibrated by methods such as steering the light in an illumination window to a number of fixed locations of a detector such as a photo detector or a human eye, which is recognized by the camera. Alternatively the detector may be moved and aligned with a number of fixed positions defined by different illuminator element array patterns. In a further example, the camera vision system may itself see the light bar image of the illuminator element array on, for example, the face of the observer and adjust it to fall over the correct eye.

It may be recognized by those skilled in the art that the output coordinate value from the tracking system may employ a significant processing time and that the coordinate value produced may have a certain lag or latency. Stated differently, the time at which the coordinate is produced may reflect the location that an observer was in a short time previously. This lag or latency may affect the maximum speed an observer may move at without introducing an error in the illuminator element position that may be perceived as flicker.

Advantageously the previously sampled locations may be used to determine the velocity and or acceleration of the observer and these figures may be processed with a knowledge of the latency to more accurately report the location of the observer at the current time 3005 as shown in FIG. 18 or at a future required time 3006 corresponding to the display illumination phase as shown in FIG. 19. Advantageously the system may generate a single eye location, or determine both eye locations from a generated nose location and knowledge of the eye separation. The eye separation may be determined for each particular observer from the camera images.

In the above examples, the illumination pulses 3001, 3002 are a control signal supplied to the illuminator elements to cause them to output a pulse of light having a period and magnitude of luminous flux that are dependent on the period and amplitude, respectively, of the illumination pulses 3001, 3002. In all the examples, described above the illumination pulses 3001, 3002 have the same period and amplitude and so cause the light sources to output light with the same period and luminous flux. As the field time is sufficiently short to minimize flicker due to the persistence of vision, the intensity of light perceived by the observer may be considered as being dependent on the time-average of the luminous flux over the field time, or over a single phase. This is appropriate to the extent that the field time is short enough to minimize flicker.

In general, the control system may be arranged, so that when the position of the viewing windows is static, individual illuminator elements are operated over a single phase (a right image phase or a left image phase) so that the time-average of luminous flux over the phase has a predetermined value. As a result, the intensity of light perceived by an observer remains substantially constant over time, thereby minimizing flicker to the extent that the field time is short enough to minimize flicker.

The illumination pulses 3001, 3002 described above are an example of an embodiment in which such control is effected, as a result of the illumination pulses 3001, 3002 having the same period and amplitude. The predetermined value may be substantially the time-average of luminous flux achieved by the individual illuminator elements for time periods when no observer movement has been detected. Such a predetermined value may be set to achieve the desired display luminance after propagation of the light to viewing windows through the directional backlight and SLM 48, with the illuminator elements operating in synchronization with the display of image data that may be provided on the temporally multiplexed SLM 48.

There will now be described examples of techniques for changing the form of the illumination pulses, and hence the luminous flux of the light output by the illuminator elements, that may be applied in the control system.

Figure 20A:
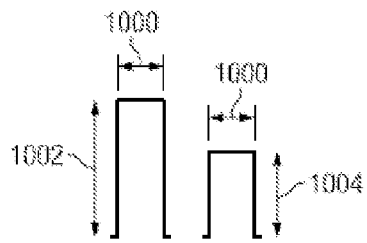
FIG. 20A is a schematic diagram illustrating pulse amplitude modulation for gray scale.

FIG. 20A is a schematic diagram illustrating pulse amplitude modulation for gray scale. Further, FIG. 20A shows how illumination pulses of the same period 1000 for different illuminator elements in the illuminator array 15 which may have slightly different performance characteristics may be arranged to be adjusted in amplitude to have different amplitudes 1002, 1004 providing pulses of light having luminous flux of correspondingly different magnitude. Thus the time-average of luminous flux is varied correspondingly. This may be used to achieve luminous flux matching, for example, by amplitude modulation.

Figure 20B:
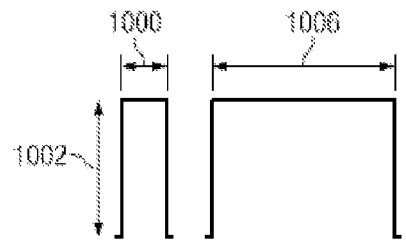
FIG. 20B is a schematic diagram illustrating pulse width modulation for gray scale.

FIG. 20B is a schematic diagram illustrating pulse width modulation for gray scale. Further, FIG. 20B shows how illumination pulses of the same amplitude 1002 for different illuminator elements in the illuminator array 15 may be adjusted by pulse width to have different periods 1000, 1006 providing pulses of light having periods of correspondingly different length. Thus the time-average of luminous flux is varied correspondingly.

Pulse amplitude and pulse width modulation effects may be combined (not shown in FIG. 20B).

Advantageously these pulse amplitude and/or pulse width modulation techniques may achieve a substantially uniform luminous flux optical window array 121. Advantageously the varied performance characteristics of the individual LEDs may be substantially matched. Further advantageously such matching may be calibrated at the window plane 106 and performed periodically during the lifetime of the display device. Further advantageously the matching may be achieved by means of the observer locating system 70, for example, a camera.

Figure 21A:
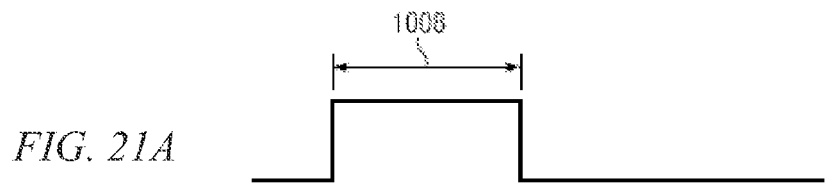
FIG. 21A is a schematic diagram illustrating a full illumination pulse suitable for a weak emitter.

FIG. 21A is a schematic diagram illustrating a full illumination pulse suitable for a weak emitter. Further, FIG. 21A shows an LED pulse of period 1008 for an element of illuminator array 15. Such a pulse may be suitable for the weakest element of the illuminator array 15.

Figure 21B:
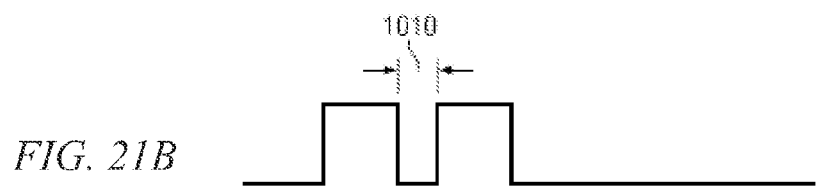
FIG. 21B is a schematic diagram illustrating a chopped illumination pulse suitable for a higher power light emitting element.

FIG. 21B is a schematic diagram illustrating a chopped illumination pulse suitable for a higher power illuminator element. Further, FIG. 21B shows how the pulse width modulation, for example, to achieve gray scale illumination or to match luminous flux may take place within the pulse rather than at an end. Chop 1010 may be made in the pulse of one of the stronger illuminator elements of the illuminator array 15 which may achieve substantially the same output luminous flux as for a weaker illuminator element of FIG. 21A. Different chops may be used to match all the stronger illuminator elements to the weakest illuminator element. Advantageously this may achieve substantially the same start and end time for most to all illuminator elements of the illuminator array 15. Advantageously the display device may be more uniformly illuminated during any SLM 48 response times.

Figure 21C:
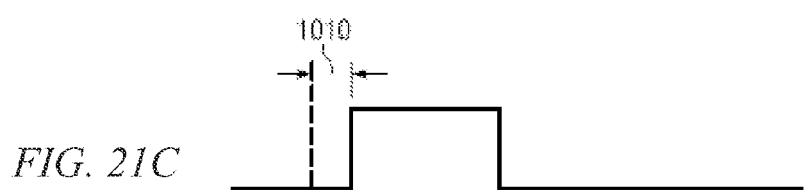
FIG. 21C is a schematic diagram illustrating a shorter pulse suitable for a higher power light emitting element.

FIG. 21C is a schematic diagram illustrating a shorter pulse suitable for a higher power illuminator element. Further, FIG. 21C shows the pulse chop 1010 at the beginning of the pulse.

Figure 21D:
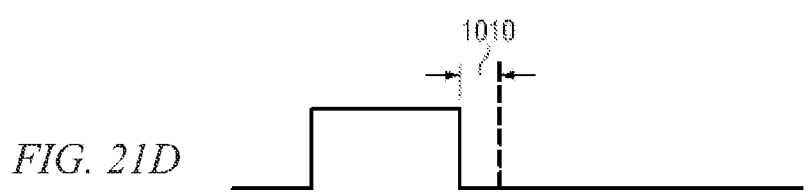
FIG. 21D is a schematic diagram illustrating a shorter pulse suitable for a higher power light emitting element.

FIG. 21D is a schematic diagram illustrating a shorter pulse suitable for a higher power illuminator element. Further, FIG. 21D shows the pulse chop 1010 at the end of the pulse.

Figure 22:
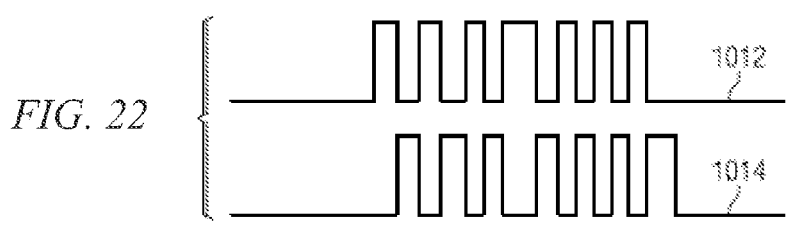
FIG. 22 is a schematic diagram illustrating a phased pulse position modulation.

FIG. 22 is a schematic diagram illustrating a phased pulse position modulation. Further, FIG. 22 shows how luminous flux matching may take place using a pulse position modulation scheme. Each illumination pulse may include a comb of individual illumination sub-pulses 1012. Further the phase of the sub illumination pulses may be arranged to be substantially "orthogonal" that is, to occur, for at least some, light emitting elements at different times as shown by the two sets of sub-pulses 1012 and 1014. Advantageously this may reduce the peak current load on the illuminator power supply (not shown in FIG. 22) and therefore reduce costs.

In the above embodiments image control unit 76 may use the observer location data from sensor 70 and control unit 72 to achieve an image display that varies in response to the observer 99 location. Advantageously this may be used to provide a "look around" facility in which, for example, the image perspective displayed on SLM 48 may be varied in response to movement of the observer 99. Such movement may be amplified to produce deliberately false perspectives.

In an illustrative embodiment in which the SLM 48 uses a liquid crystal material, and is line by line addressed, the electro optic response characteristics of the LC material may be important. Furthermore the pulsed illumination may interact with the scanning and the LC response in such a way that may result in different appearances of pixels located at different spatial positions on the SLM 48 even if they were addressed with the same original data. This effect may be eliminated by pre-processing the raw image data to make a correction. A modification of image data may also be made to compensate for predicated crosstalk between left and right views.

Further advantageously the knowledge of the observer 99 location may be used to provide a more effective adjustment of the image data to SLM 48 in order to compensate for the effects described above.

Figure 23:
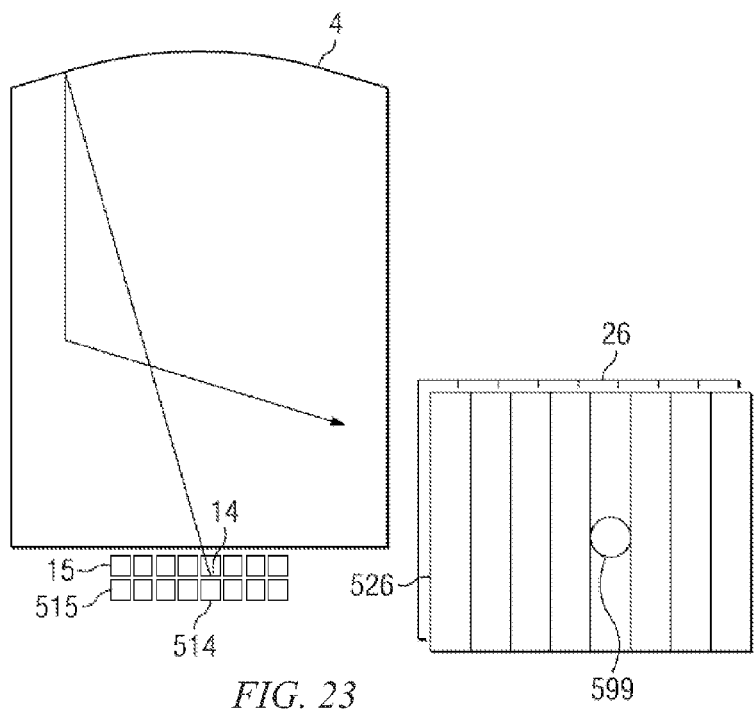
FIG. 23 is a schematic diagram illustrating a further embodiment of a directional display device including an integrated infrared emitting element array arranged to provide a fan of beams to illuminate an observer and to provide an observer tracking function.

In a further embodiment as shown in FIG. 23 the illuminator array 15 of light emitting elements may be aligned with an illuminator array of emitting elements 515, for example infra-red LEDs, not intended for visual illumination but which may be arranged to cooperate with sensor 70 to aid the detection of the observer 99 location. FIG. 23 is a schematic diagram illustrating a further embodiment including an integrated infrared emitting element array arranged to provide a fan of beams to illuminate an observer and to provide an observer tracking function. The infrared LEDs may provide an easily identifiable location of the observer's pupils 599 through reflection from the retina. Thus element 514 may be directed to a window 526 approximately aligned with window 26 by the same optical system as for the display illumination, and thus be substantially co-located in the viewing space. Advantageously, the LEDs may be arranged in the same package to reduce the cost of alignment and packaging of the respective illuminator array 515 and light emitting element illuminator array 15. Advantageously the illuminator array of emitting elements 515 may be separately addressable from the illuminator array 15. Advantageously such an arrangement may achieve a self-aligning fan of infrared beams that may provide illumination of the observer plane. The fan of beams may be temporally scanned in luminous flux so the timing of the retro reflected beam may be measured, achieving a low cost measurement system compared to the camera sensor and processing overhead of the camera embodiments. Alternatively, a separate infrared detector may be used to detect pupil position.

There will now be considered the operation of the control system when shifting the position of the viewing windows in response to the detected position of the observer changing laterally across the display device 100. In this case the control system controls the illuminator elements corresponding to optical windows of left and right viewing windows that are closest to each other by ceasing operation of a given illuminator element in one of the left and right image phases and starting operation of the same or different illuminator element in the other one of the left and right image phases.

Figure 24:
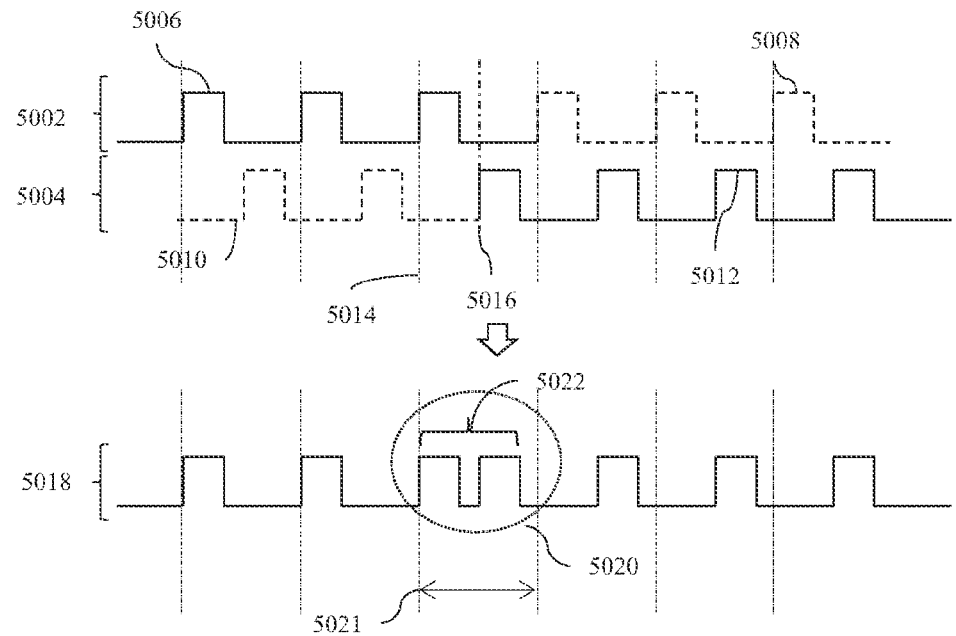
FIG. 24 is a schematic timing diagram of illumination pulses including the double pulse that occurs in one case for a tracked observer.

FIG. 24 is a schematic diagram illustrating an example of pulse waveforms 5002, 5004 that may be supplied to at least one light emitting element illuminator array 15 that may be provided during operation in an autostereoscopic display apparatus. An example waveform suitable for driving the illuminator elements, which in this illustrative embodiment are LEDs, in the left image phase corresponding to illumination of a left optical window is 5002 and an example waveform for the right image phase corresponding to the right optical window is 5004. Thus the dotted lines represent a time interval 5021 between the start of subsequent left image phases, corresponding to a left image phase and a right image phase combined.

In this example and the subsequent examples described herein, operation is ceased in the left image phase and started in the right image phase. This is performed in response to detection of the observer 99 moving from right to left across the display device 100. An inverse control, that is ceasing operation in the right image phase and starting operation in the right image phase is performed in response to detection of the observer 99 moving from left to right across the display device 100. The control in response to different lateral movement of the observer 99 is entirely symmetrical and so this and subsequent examples may equally be applied to movement of the observer in the opposite direction by inverting the right and left image phases. Thus, the inverse control is not separately described or illustrated. However, references (a) left and (b) right, may be generalized to (a) either one of left or right, and (b) the other one of left or right.

In general, depending on whether the left and right viewing windows are separated, the waveforms 5002, 5004 may be applied to the same illuminator elements or to different illuminator elements. That is, if there is no separation between the left and right viewing windows, then the waveforms 5002, 5004 may be applied to the same illuminator element, so that an illuminator element in the nose region of the observer 99 ceases operation in the left image phase and starts operation in the right image phase. Conversely, if there is a separation between the left and right viewing windows, then the waveforms 5002, 5004 may be applied to different illuminator elements, so that an illuminator element to the trailing side of the nose region of the observer 99 ceases operation in the left image phase and another illuminator element to the leading side of the nose region of the observer 99 starts operation in the right image phase. However, for ease of understanding, the pulses in the left and right image phases are separated as the two waveforms 5002, 5004 in FIG. 24 irrespective of whether they are applied to the same illuminator element.

The time interval 5021 is determined by the update rate of the left image to the SLM 48. The timing of pulses 5006, 5012 in the waveforms 5002, 5004 is phase shifted and is arranged in correspondence to the timing of the display of left image and right image data on the SLM 48. The length of the ON, or illumination, pulse 5006 may be less than the respective field length of the SLM 48, to achieve improved cross talk and contrast of the displayed image. In operation at least one group of illuminator elements is directed to the left eye, driven by for example waveform 5002 and at least one group of illuminator elements is directed to the right eye, driven by for example waveform 5004. It is advantageous to give special treatment to the boundary between the left and right eye groups, for example as will be described below.

A stationary observer may thus receive light from the respective illuminator elements of illuminator array 15 illuminated by pulses 5006 in the left image phase. When the observer moves position across the window 26 such that the right eye moves toward the original position of the left eye, then the control system (described above) may determine that the window 26 illuminated by the respective illuminator element should be substantially synchronized with the right eye image rather than the left eye image. As discussed herein, pulses such as 5006, 5012 of pulse waveforms 5002, 5004 respectively of FIG. 24 may be referred to as pulses of left and right image phases respectively. Thus the left image phase of the SLM 48 is synchronized with the left pulses 5006 and the right image phase of the SLM 48 is synchronized with the right pulses 5012. The time interval of the transition region may be the same as the time interval 5021, and may be determined by the update timing of the SLM 48.

Accordingly, the respective illuminator element may change illumination phase from synchronization with the left image to synchronization with the right image. The light may thus steer to the correct position for the moving observer (as described above) with the left to right transition in the region of the observer's nose. The illumination waveform is illustrated in FIG. 24 as solid lines for left and right phases of illumination, with dotted lines illustrating what the illumination phase would have been without switching phase. Thus the last left pulse starts at time 5014 whereas the first right pulse starts at time 5016.

FIG. 24 illustrate an example in which the final instance of operation in the left image phase and the initial instance of operation in the right image phase occur in an adjacent pair of left and right image phases. Also illustrated in FIG. 24 is a waveform 5018 representing the intensity of light perceived by the observer 99 resulting from application of the waveforms 5002, 5004 (noting that when the waveforms 5002, 5004 are applied to the same illuminator element, this corresponds to the waveform applied thereto) as the observer 99 moves to one side. It is noted that this waveform shows a transition from illumination in the left phase to illumination in the right phase, and at the transition region 5020 a closely spaced or double pulse 5022 may occur. The waveform 5018 in FIG. 24 may result in a perceived brightness artifact in the transition region 5020 that may be seen by the observer 99 as a bright flash.

Figure 25:
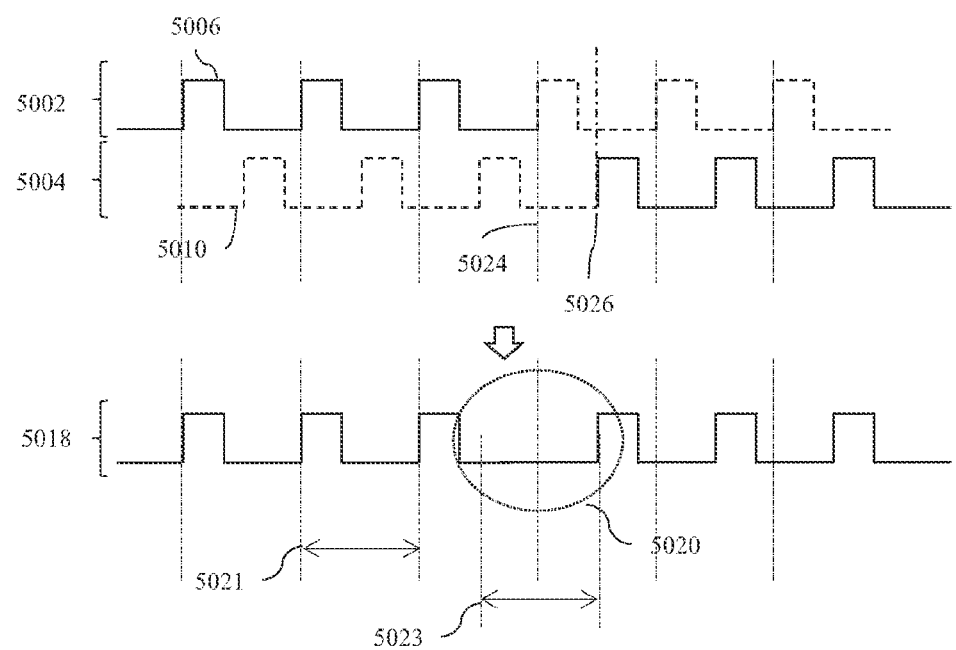
FIG. 25 is a schematic timing diagram of illumination pulses including the missing pulse that occurs in one case for a tracked observer.

Conversely, FIG. 25 illustrates an example similar to that of FIG. 24 but in which the initial instance of operation in the right image phase is delayed compared to FIG. 24 to the next available right image phase with the result that there is an adjacent pair of left and right image phases in time period 5023 in which there are no pulses at all. Thus, in the transition region 5020 a widely spaced or missing pulse may occur. In this case, in the transition region 5020 with a time interval 5025 that may be the same as time interval 5021, a pulse that would have occurred at time 5024 does not occur, and instead the next pulse appears at time 5026. Thus, the waveform 5018 in FIG. 25 may result in a perceived brightness artifact in the transition region 5020 that may be seen by the observer 99 as a dark flash.

Therefore, whichever of the alternative waveforms of FIGS. 24 and 25 are applied, the observer may perceive a brightness artifact in the transition region 5020 that may be seen as either a bright or a dark flash.

There will now be described and illustrated some embodiments in which the control performed by the control system is modified to reduce such brightness artifacts.

In FIGS. 26 to 31, there are illustrated some embodiments wherein the illuminator elements operated in the left image phases are contiguous in the array of illuminator elements with the illuminator elements operated in the right image phases so that the same illuminator element ceases operation in the left image phase and starts operation in the right image phase. Thus, FIGS. 26 to 31 illustrate waveforms of the control signals supplied to a given illuminator element to cause it to output light, consisting of illumination pulses in left and right image phases, as described above.

Figure 26:
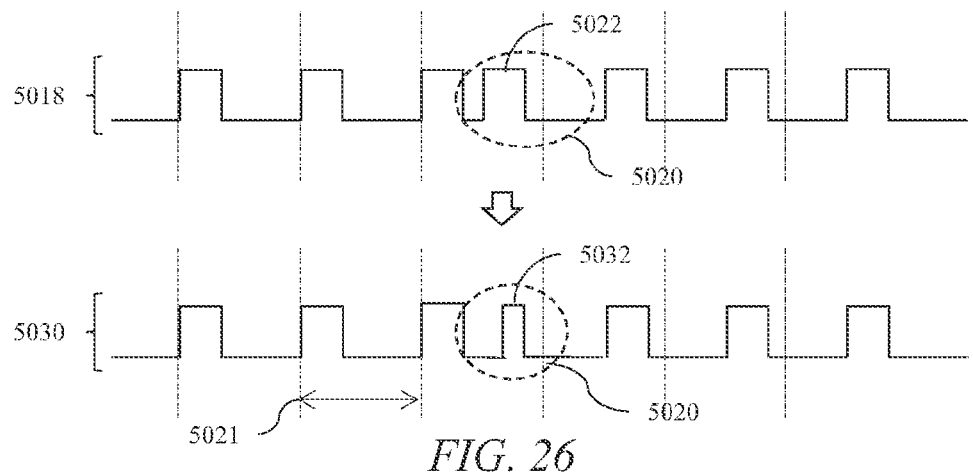
FIGS. 26 to 31 are schematic timing diagram of illumination pulses illustrating further embodiments that reduce the visual effect of the double pulse.

FIG. 26 illustrates schematically one example of compensation for a double pulse (bright) artifact. The control signal supplied to the illuminator element has a waveform 5030 that in region 5020 causes operation in the left image phase to cease and operation in the right image phase to start. In this example, similar to waveform 5018 shown in FIG. 24, the final instance of operation in the left image phase is before the initial instance of operation in the right image phase by pulse 5032, and the final instance of operation in the left image phase is by a pulse that has a normal pulse period so that over that phase the time-average of luminous flux is the predetermined value. However, in contrast with waveform 5018 shown in FIG. 24, the initial instance of operation in the right image phase is by pulse 5032 that has a shortened period so that over that phase the time-average of luminous flux is less than the predetermined value.

Advantageously, in the present embodiments, by processing the waveforms to the illuminator elements of the illuminator array 15 in the transition regions between left and right phases the conditions that may result in a brightness artifact can be compensated for.

Figure 27:
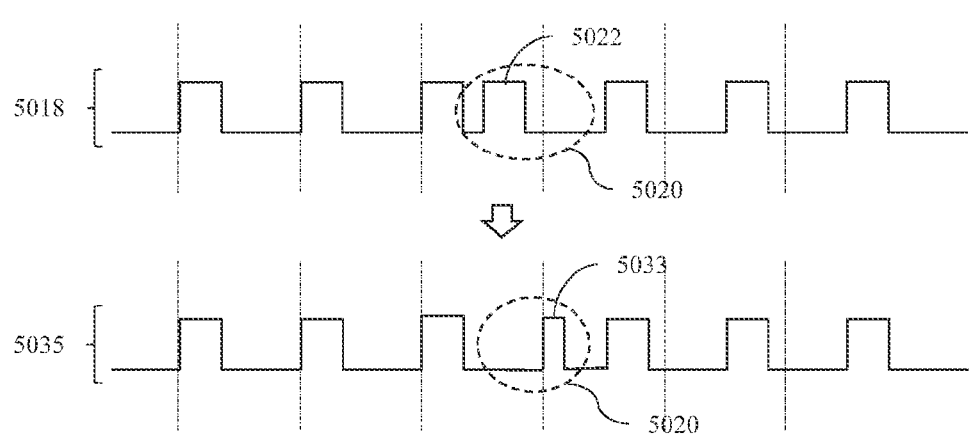

FIG. 27 illustrates schematically a further example of compensation for a double pulse (bright) artifact. The control signal supplied to the illuminator element has a waveform 5035 that in region 5020 causes operation in the left image phase to cease and operation in the right image phase to start. In this example, similar to waveform 5018 shown in FIG. 24, the final instance of operation in the left image phase by a pulse 5033 is before the initial instance of operation in the right image phase by a pulse which itself has a normal pulse period so that over that phase the time-average of luminous flux is the predetermined value. However, in contrast with waveform 5018 shown in FIG. 24, the final instance of operation in the left image phase is by a pulse 5033 that itself has a shortened period so that over that phase the time-average of luminous flux is less than the predetermined value. Thus, the pulse 5033 may be arranged to be in the opposite image phase to the pulse 5032 of FIG. 26, so that for example a right image is seen rather than a left image at the time of transition. Advantageously, such an embodiment may achieve reduced image flicker.

Figure 28:
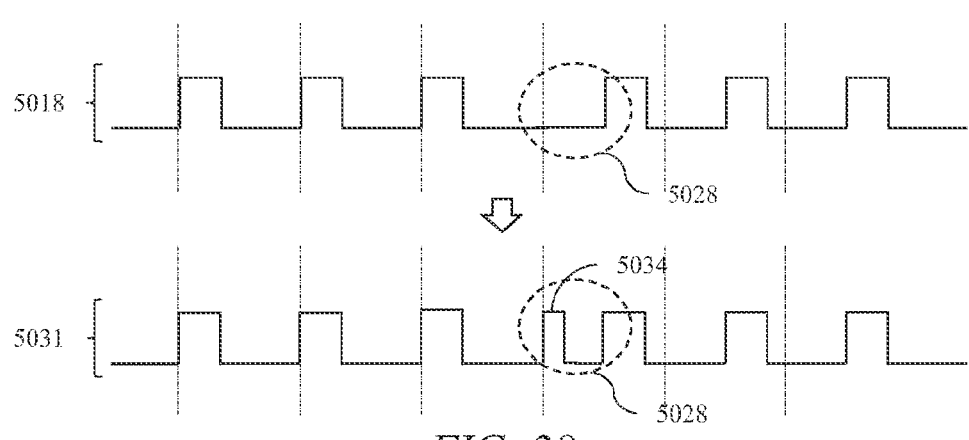

FIG. 28 illustrates schematically one example of compensation for a missing (dark) pulse in original waveform 5018 in region 5020, as illustrated in FIG. 25. The control signal supplied to the illuminator element has a waveform 5031 that in region 5028 causes operation in the left image phase to cease and operation in the right image phase to start. In this example, the waveform 5031 is similar to the waveform 5035 of FIG. 27.

Figure 29:
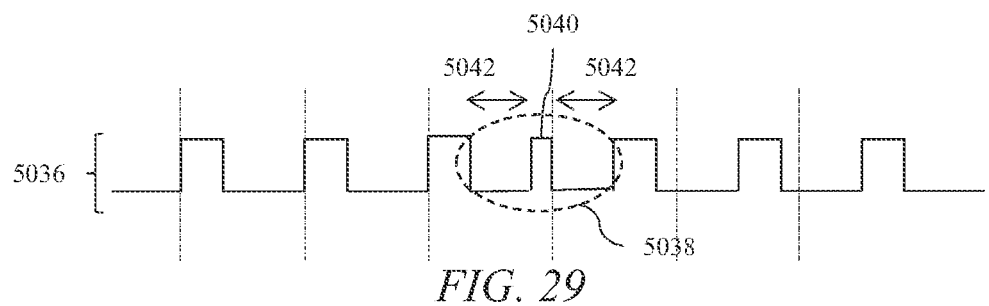

FIG. 29 is a schematic diagram illustrating a further embodiment including centering of the intermediate pulse 5040. The control signal supplied to the illuminator element has a waveform 5036 that in region 5038 causes operation in the left image phase to cease and operation in the right image phase to start. In this example, the waveform 5036 is similar to the waveform 5030 of FIG. 26, except that the initial instance of operation in the right image phase a pulse 5040 that is shifted so as to be arranged temporally approximately equidistant with the same time interval 5042 between preceding and following pulses as illustrated in FIG. 29. Advantageously such an embodiment achieves further reduction in appearance of the flicker artifact for a moving observer.

Figure 30:
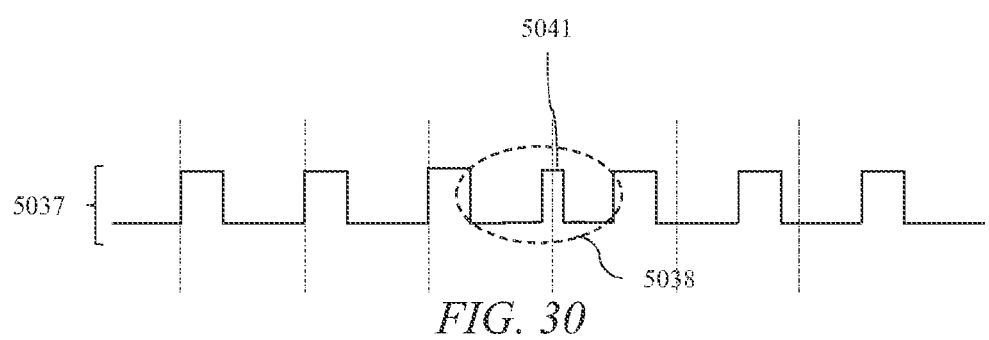

FIG. 30 is a schematic diagram illustrating a further embodiment including arranging of the intermediate pulse 5040 around the start of an illumination phase. The control signal supplied to the illuminator element has a waveform 5037 that in region 5038 causes operation in the left image phase to cease and operation in the right image phase to start. In this example, the intermediate pulse 5040 is effectively formed by the initial instance of operation in the right image phase and the final instance of operation in the left image phase. Thus, the final instance of operation in the left image phase is after the initial instance of operation in the right image phase. Furthermore, the final instance of operation in the left image phase and the initial instance of operation in the right image phase are each performed by pulses having a shortened period that is half the normal period so that over each respective phase the time-average of luminous flux is half the predetermined value. Advantageously, modifying the drive waveforms as described in FIG. 30 may achieve a mixture of left and right eye illumination of the SLM 48 at the transition, and thus reduce flicker artifacts in those parts of the display from which light from the transition illuminator elements are visible.

In all of the above examples, the brightness artifacts of a bright flash of the type of FIG. 24 or a dark flash of the type of FIG. 25 are reduced by altering the waveform of the control signal in a manner that reduces the overall time-average of the luminous flux at the in region 5020 compared to FIG. 24 and that increases the overall time-average of the luminous flux at the in region 5020 compared to FIG. 25. Other waveforms may be used to produce a similar effect.

The situation shown in FIG. 24 arises because the transition causes an adjacent pair of a left image phase and a right image phase to have a time-average of luminous flux of the illuminator element that is twice said predetermined value. In the general case to reduce flicker, the control signal is modified so that over each adjacent pair of a left image phase and a right image phase, the time-average of the luminous flux of the illuminator element which is changed from operation between the left and right image phases is less than twice said predetermined value. This is achieved by each of the waveforms shown in FIGS. 26 to 30.

Similarly, the situation shown in FIG. 25 arises because the transition causes an adjacent pair of a left image phase and a right image phase to have a time-average of luminous flux of the illuminator element that is zero. In the general case to reduce flicker, the control signal is modified so that over each adjacent pair of a left image phase and a right image phase, the time-average of the luminous flux of the illuminator element which is changed from operation between the left and right image phases is more than zero. This is achieved by each of the waveforms shown in FIGS. 26 to 30.

In all of the above examples, the time-average of luminous flux of a pulse is controlled to be less than the predetermined value by reducing the period of the pulse, that is by time modulation. In general, such control of the time-average of luminous flux of a pulse may be performed using any one or any combination of the techniques shown in FIGS. 20A to 21D, for example by changing the amplitude, position and/or duration of the pulse 5032.

Figure 31:
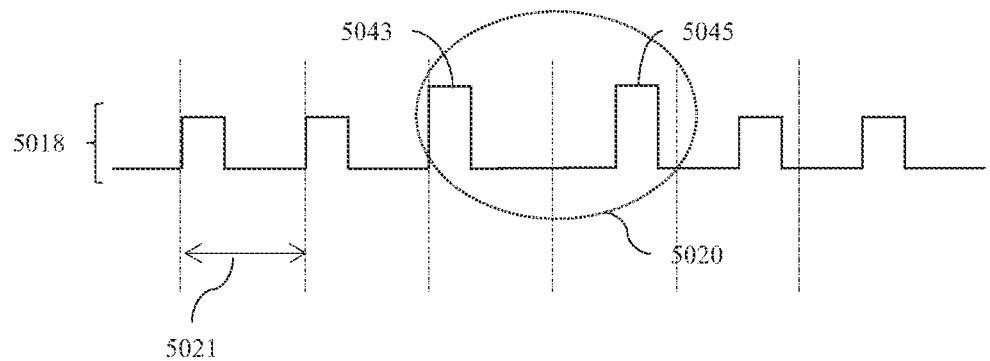

FIG. 31 is a schematic diagram illustrating a further embodiment including providing increased luminous flux of pulses in the transition region 5020. The control signal supplied to the illuminator element has a waveform 5018 that in region 5020 causes operation in the left image phase to cease and operation in the right image phase to start. In this example, the waveform 5018 is the same as shown in FIG. 25 except that the final instance of operation in the left image phase and the initial instance of operation in the right image phase are performed, respectively, by pulses 5043 and 5045 that have an increased amplitude so that over that over each of those phases the time-average of luminous flux is greater than the predetermined value. Thus the time integrated luminous flux over the transition region 5020 is matched to the time integrated luminous flux at other times, thereby reducing the brightness artifact of a dark flash that occurs in FIG. 25. Advantageously, modifying the drive waveforms as described in FIG. 31 may achieve reduced flicker artifacts in those parts of the display from which light from the transition illuminator elements are visible.

Advantageously, modifying the drive waveforms as described in FIGS. 26 to 31 may reduce the appearance of a brightness flicker effect for the observer and thus improve the quality of the display for a tracked observer.

Such modification of the control may be implemented in the control system in a straightforward manner simply by modifying the form of the control signals generated thereby. Some possible techniques are as follows.

Figure 32:
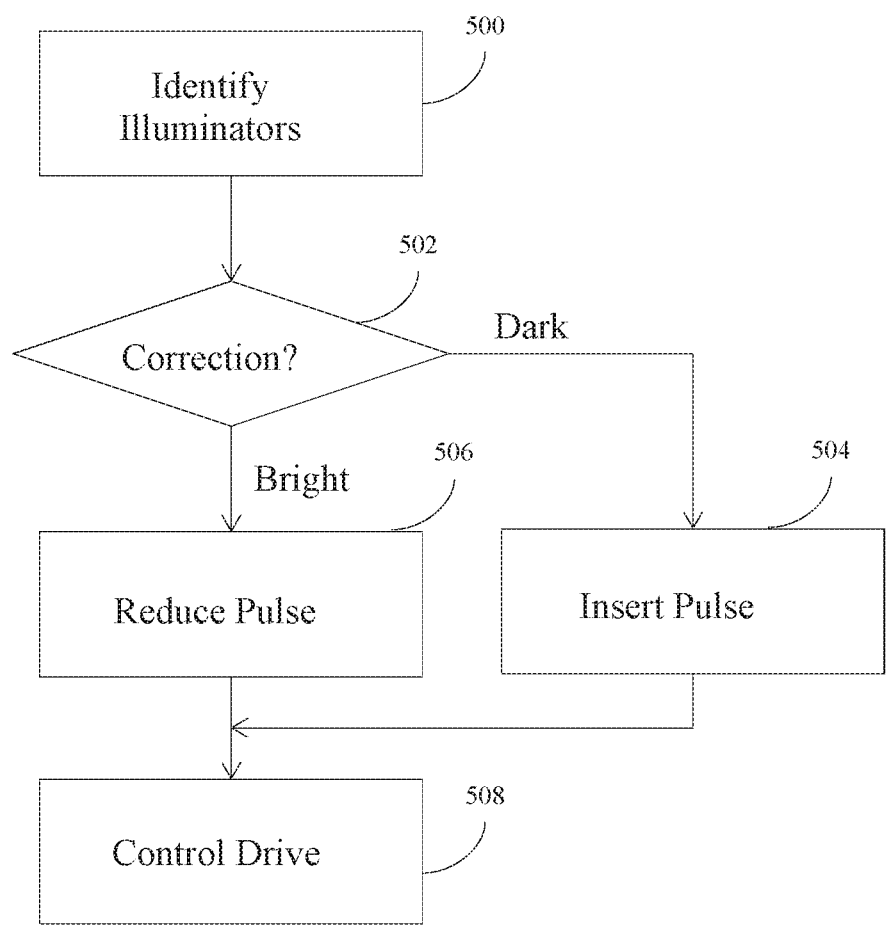
FIG. 32 is a schematic diagram illustrating a control method to drive a switch LED with a modified output to reduce image flicker.

FIG. 32 is a schematic diagram illustrating a further embodiment comprising a further control method to drive a switch illuminator element with a modified output to reduce image flicker.

The first step 500 is to identify the candidate illuminator elements which may potentially be affected by a bright or dark pulse artifact. These illuminator elements correspond to those in a region which is imaged physically to the region between the eyes corresponding to the nose position of the observer. This may be done for example as will be described in FIG. 43.

The next step 502 is to determine if the correction is required for a bright pulse (a short gap between pulses) or a dark pulse (a long gap between pulses). This may be achieved for example by the method illustrated in FIGS. 44 and 60C. Other detection methods such as timing or measuring the pulse gap for example with a counter/timer circuit could be used. In the case of a bright pulse event block 506 is used to reduce the pulse that is applied to the affected illuminator elements. The pulse may be reduced in length for example to 50% of the width of the pulse that was previously applied or may be reduced in amplitude or a combination of the two so that the effect of the bright pulse artifact is reduced.

In the case of a dark pulse artifact, block 504 is used to insert a short pulse for example a pulse 50% of the length of the standard illumination pulse width. The pulse may alternatively be reduced in amplitude or a combination of width and amplitude in order to compensate for the dark pulse artifact. The modified illuminator element pulse information is then passed to block 508 which controls drive to the illuminator element array.

Figure 33:
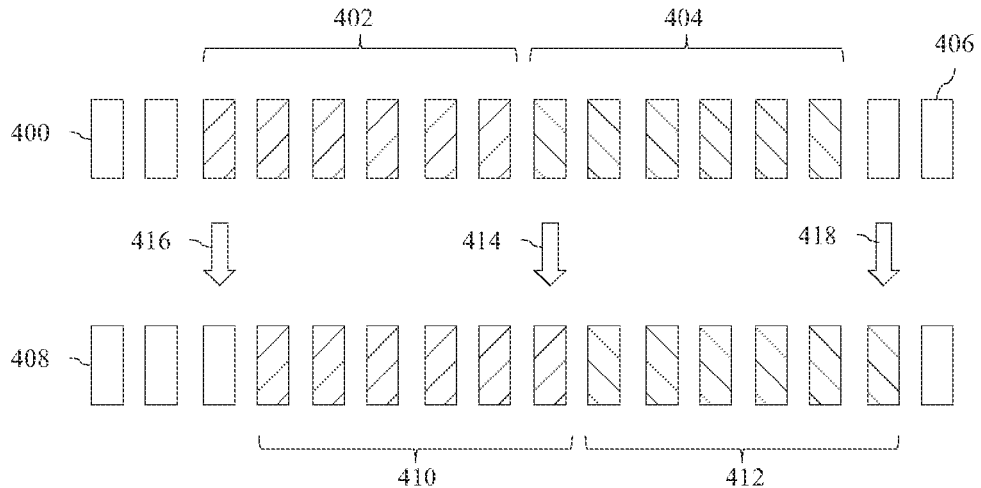
FIG. 33 is a schematic timing diagram for switching of an LED array in a first pattern between first and second illumination positions.

FIG. 33 is a schematic diagram illustrating a further embodiment including switching of an illuminator element array in a first pattern between first and second illumination positions. illuminator array 400 comprising individually addressable array of illuminator elements is arranged with non-illuminated illuminator elements 406, left phase illuminated illuminator elements 402 and right phase illuminated illuminator elements 404. After an observer movement, illuminator elements 410 and 412 are used instead of 402, 404 respectively. As described in FIGS. 24 and 25, such switching and position 414 can create a flicker artifact. Similar but typically less detrimental artifact can be observed for illuminator element positions 416, 418. However, such positions are typically removed from eye positions compared to position 414 and are of less significance. However, the correction methods described herein can advantageously be applied to correct luminous flux changes in window positions corresponding to illuminator elements 416, 418 if desired.

Figure 34:
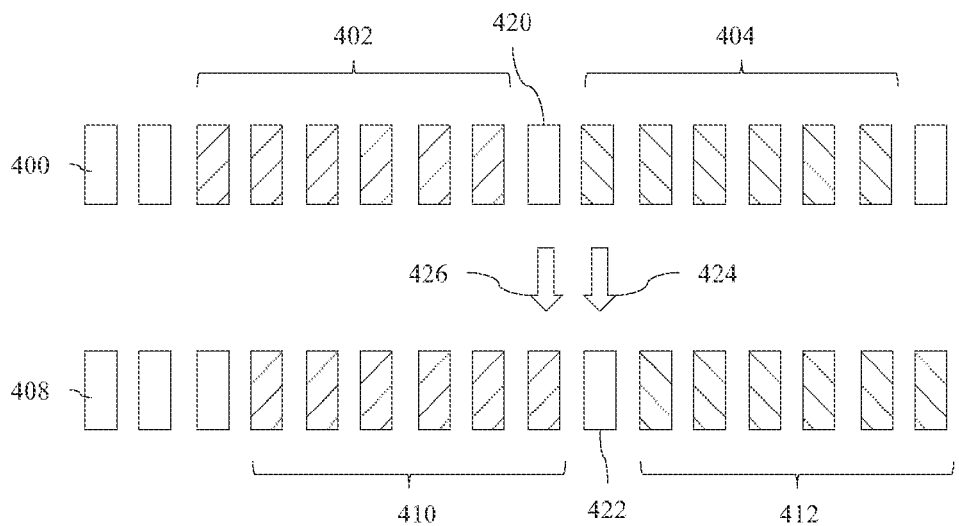
FIG. 34 is a schematic timing diagram for switching of an LED array in a second pattern between first and second illumination positions.

FIG. 34 is a schematic diagram illustrating a further embodiment including switching of an illuminator array in a second pattern between first and second illumination positions. In this embodiment, a central illuminator element 420 is not illuminated. Advantageously, such an arrangement can improve image cross talk. However, light from positions 424, 426 can bleed to both left and right eyes. Such a bleeding can result in a flicker artifact similar to that described in FIGS. 24 and 25, even though two illuminator elements are switching. Thus the correction mechanisms of the present embodiments can advantageously applied to arrangements with non-contiguous left and right LEDs 402, 404.

Figure 35:
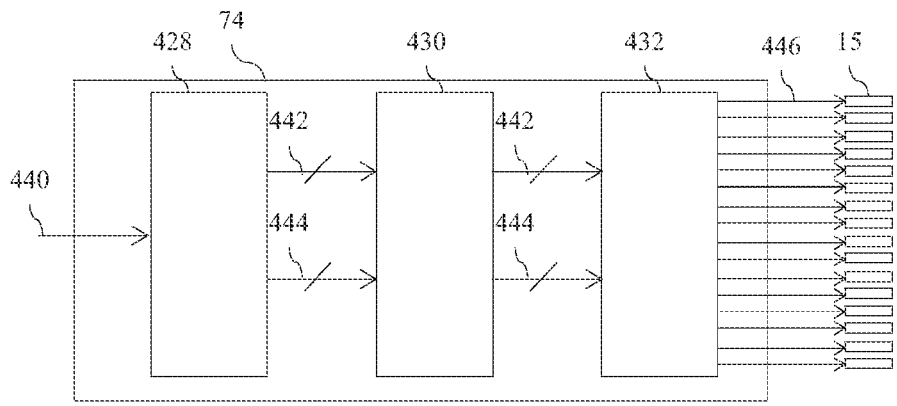
FIG. 35 is a schematic diagram illustrating a control system to achieve uniform switching of an LED array between first and second positions.

FIG. 35 is a schematic diagram illustrating a further embodiment comprising a control system to achieve uniform switching of an illuminator array between first and second positions. Illumination controller 74 may comprise data input 440 containing position information about the Observer, information controller 428 to determine illuminator element left and right phase control lines 442, 444 based on the illumination mode the display is operating in, transition illuminator element controller 430 which identifies potential flicker artifacts and compensates for them, and may further comprise illuminator element driver 432 arranged to drive lines 446 connected to illuminator elements of array 15. Alternatively transition illuminator element control may be performed with the control lines 446 rather than as a separate pre-conditioning control element. Advantageously such a control system can achieve real time correction of transition illuminator element switching, thus reducing image flicker at low cost and high speed.

It is desirable to identify which groups of illuminator elements may be switching from left to right eye phases, thus creating flicker artifact identified in FIGS. 24 and 25. Such illuminator element groups may be those in the nose region, or in other regions where the phase of an illuminator element or closely spaced illuminator elements changes from left to right eye phase. Such illuminator elements may be referred to herein as transition illuminator elements. Note they need not be at the centre of the illuminator array 15, and the transition illuminator elements move with the position of the observer.

Figure 36:
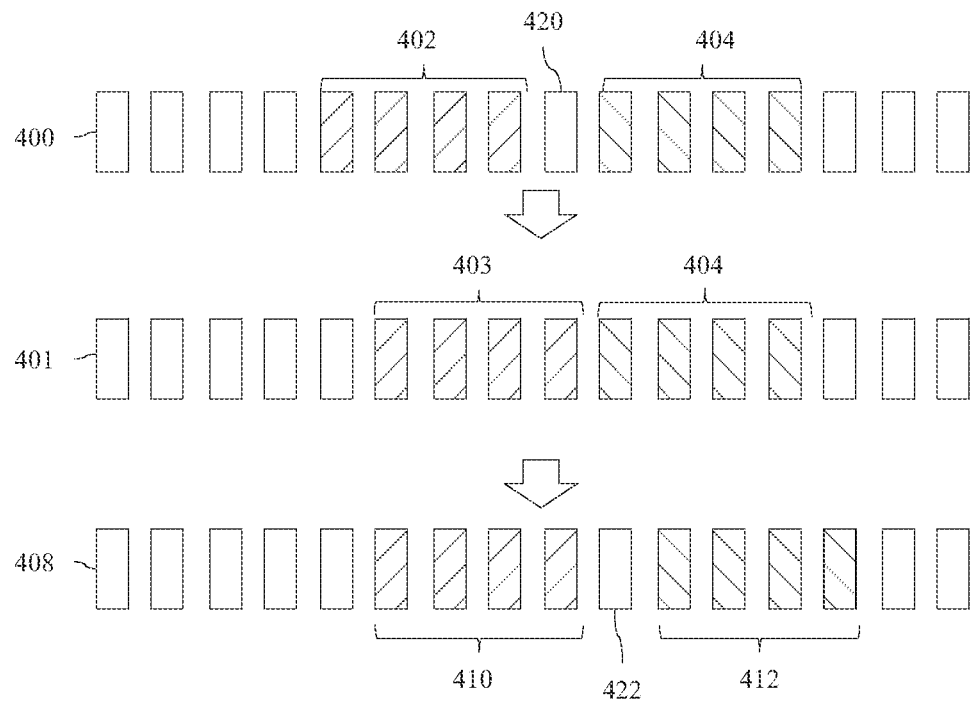
FIG. 36 is a schematic diagram illustrating switching of an LED array in a second pattern between first and second illumination positions with no central LED control.

FIG. 36 is a schematic diagram illustrating the steps of switching of an illuminator array in a second pattern between first and second illumination positions with no central illuminator element control. In a similar manner to that shown in FIGS. 24 and 25, it can be seen that in a first switching sequence, the left eye group 402 moves before the right eye group 404 so that group 403 is arranged contiguous with group 404. This removes the gap between the windows for a brief period before group 404 moves to group 412. In this manner, the corresponding window will see a pulse of higher brightness.

Figure 37:
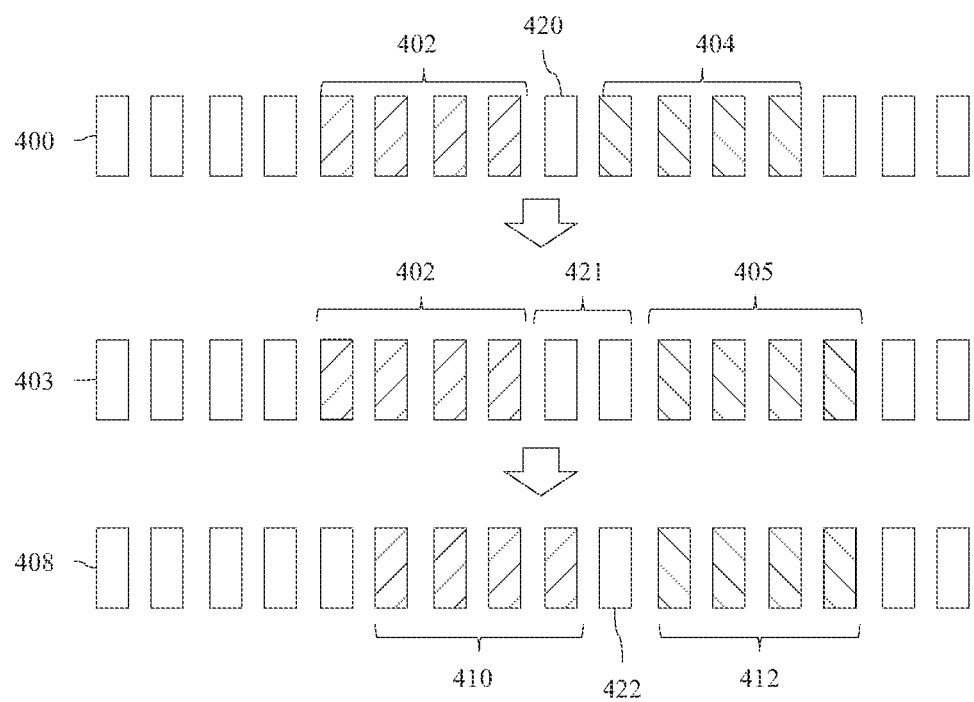
FIG. 37 is a schematic diagram illustrating switching of an LED array in a second pattern between first and second illumination positions with no central LED control.

FIG. 37 is a schematic diagram illustrating the steps of switching of an illuminator array in a second pattern between first and second illumination positions with no central illuminator element control. Thus in a second switching sequence, the left eye group 402 moves after the right eye group 404 so that group 405 is arranged with a group 421 of no illumination. This doubles the gap between the windows for a brief period before group 402 moves to group 410. In this manner, the corresponding window will see a pulse of lower brightness.

Thus it can be shown that the control of switching of the central illuminator elements is required for both contiguous and non-contiguous groups 402, 404 of illuminator elements.

Whilst FIGS. 26 to 31 illustrate embodiments wherein the same illuminator element starts operation in the right image phase as ceased operation in the left image phase, as an alternative a different illuminator element may start operation in the right image phase as ceased operation in the left image phase. This occurs in the case that the illuminator elements operated in the left and right image phases are separated in the array of illuminator a different. With such control the reduction of brightness artifacts may be achieved in a similar manner to that described above, except that the illuminator element that ceases operation in the left image phase and the illuminator that starts operation in the right image phase are controlled by separate control signals, rather than a common control signal. Embodiments equivalent to those of FIGS. 38 to 43 may be implemented by splitting the control signals shown therein into such separate control signals. Some other examples of embodiments where two different illuminator elements start operation in the right image phase and cease operation in the left image phase are as follows.

Figure 38:
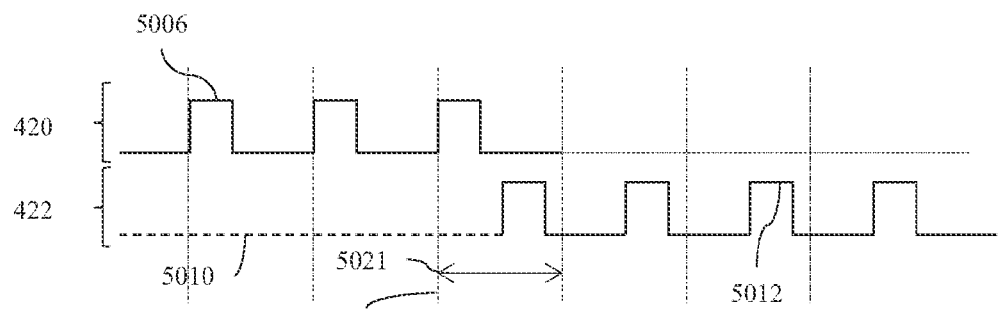
FIGS. 38 to 42 are schematic timing diagram of illumination pulses that reduce the visual effect of a double pulse.
Figure 39:
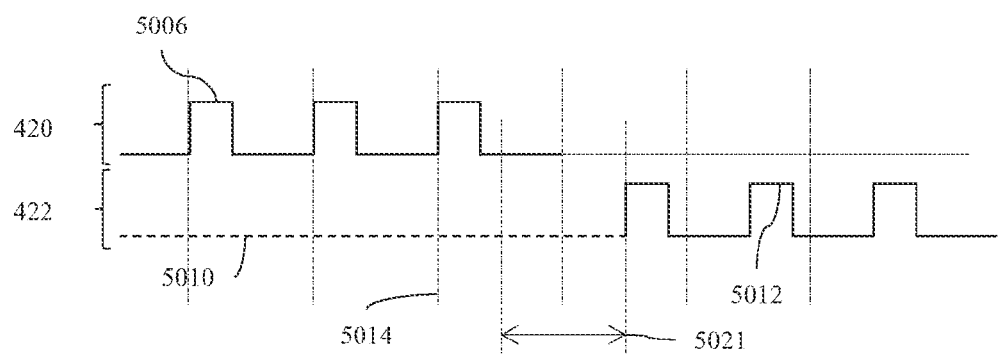

FIGS. 38 and 39 are schematic diagrams illustrating pulse waveforms 420, 422 of control signals applied to the different illuminator elements that are equivalent to the control signals shown in FIGS. 24 and 25, and which would respectively produce bright and dark flicker artifacts during switching of a illuminator element between left and right image phases.

Figure 40:
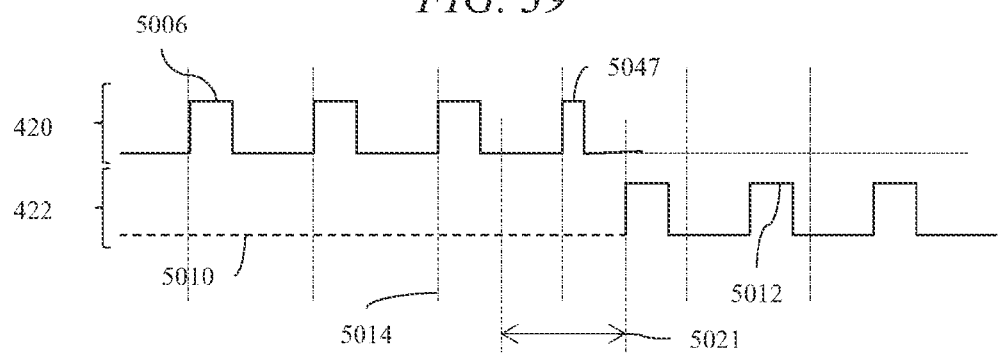
Figure 41:
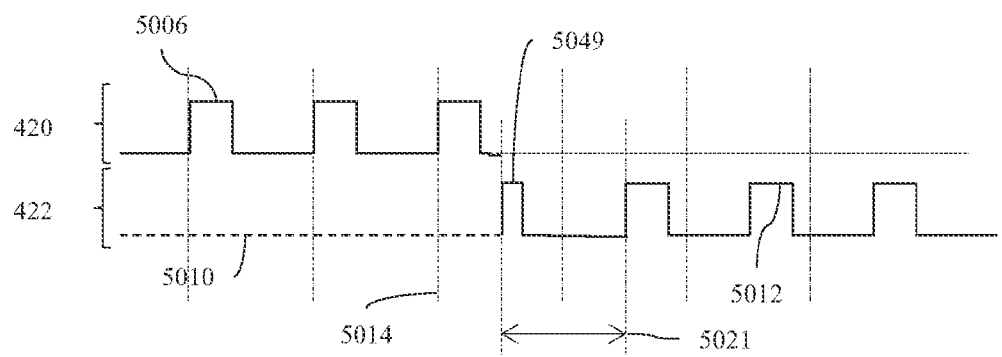

In contrast, FIGS. 40 and 41 are schematic diagrams illustrating pulse waveforms 420, 422 of control signals applied to the different illuminator elements that reduce such brightness artifacts by respectively introducing pulses 5047, 5049 that have reduced period to reduce the visibility of the brightness artifact but maintain panel illumination.

In the case of FIG. 40, the additional pulse 5047 is provided in the control signal having waveform 420 to perform the final instance of operation in the left image phase. The result is similar to that of FIG. 27, as follows. The final instance of operation in the left image phase by a pulse 5047 provided by the control signal of waveform 420 is before the initial instance of operation in the right image phase provided by the control signal of waveform 422 supplied to the different illuminator element. That initial instance of operation in the right image phase is performed by a pulse in waveform 422 that itself has a normal pulse period so that over that phase the time-average of luminous flux is the predetermined value. However, the final instance of operation in the left image phase by a pulse 5047 in waveform 420 that has a shortened period so that over that phase the time-average of luminous flux is less than the predetermined value.

Figure 42:
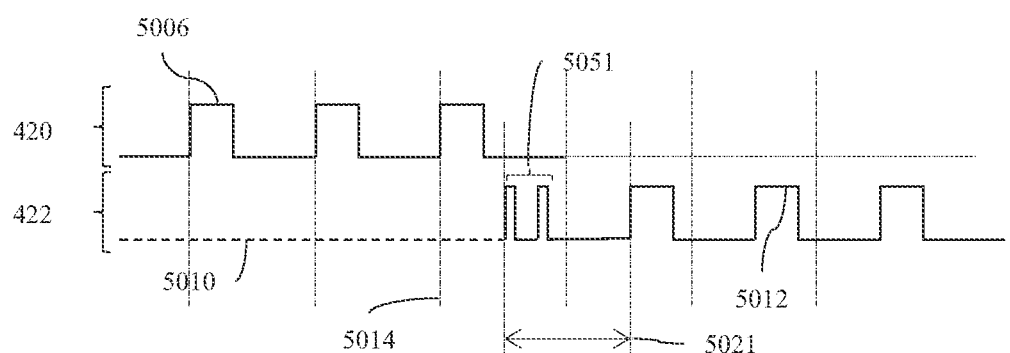
Figure 43:
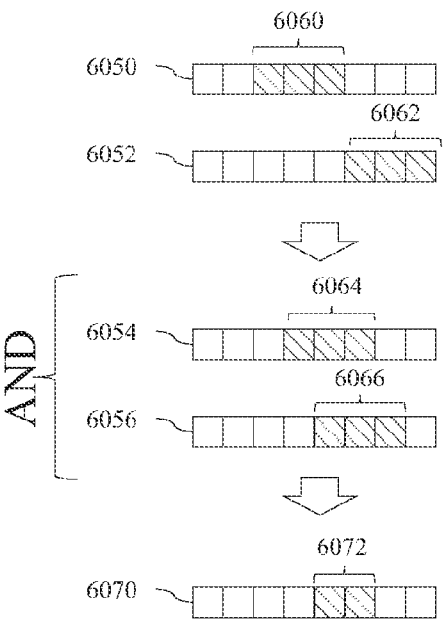
FIG. 43 is a schematic diagram illustrating a control method to identify switching LED groups.

FIG. 42 is a schematic diagram illustrating further pulse waveforms 420, 422 wherein a pulse 5051 is inserted comprising more than one illumination time, with a total width the same as pulse 5049 of FIG. 42. Advantageously, the inserted illumination pulse can be arranged to coincide with illumination of more than the top region of a sequentially addressed spatial light modulator, increasing uniformity across the area of the SLM 48. FIG. 43 is a schematic diagram illustrating a control method that may optionally be implemented in the control system to identify transition LEDs. Reference is made to an illuminator array comprising LEDs, but similar techniques could be applied to other types of light source.

It would be desirable to implement the control of the transition LEDs locally to the LED drive system as opposed to within a system controller, thus reducing cost and complexity. FIG. 43 describes a method to achieve local control of the transition LEDs, that is the LEDs in the transition region 5020 at a given time. The transition LEDs may be identified in the illumination array control circuit by for example the following method. Arrays 6050 and 6052 comprise groups 6060 and 6062 corresponding to illuminated LEDs in a first position for example and corresponding to the illumination of the left and right eyes respectively. In a first step, the group 6060 in array 6054 is shifted to the right to achieve array 6054 with group 6064, while group 6062 is shifted to the left in array 6052 to achieve array 6056 with group 6066. In a second step a logical AND operation may be performed between arrays 6054, 6056 to create array 6070 with group 6072 that identifies the transition LEDs and to which a correction for a flicker artifact may be advantageous.

In an arrangement as shown in FIG. 8 for example, LED arrays may provide multiple groups of illuminated LEDs. It may be desirable to identify respective switching LED patterns between the multiple groups of LEDs that switch in a similar manner to the transition LEDs. Advantageously flicker for regions of the LED array that are switching between left and right eye phases for moving observers can be reduced.

Figures 44, 45:
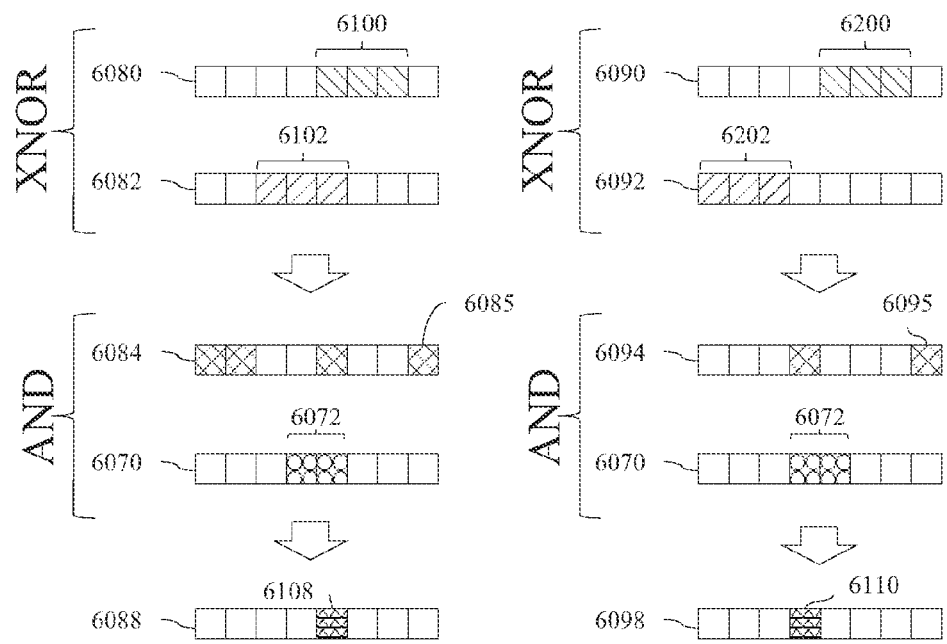
FIG. 44 is a schematic diagram illustrating a further control method to identify switching LED groups in a first illumination arrangement.
FIG. 45 is a schematic diagram illustrating a further control method to identify switching LED groups in a second illumination arrangement.

FIG. 44 is a schematic diagram illustrating a further control method to identify switching LED groups in a first illumination arrangement corresponding to a bright pulse artifact. FIG. 45 is a schematic diagram illustrating a further control method to identify switching LED groups corresponding to a dark pulse artifact. Which of the transition LEDs benefits from a correction may be identified in the illumination array control circuit by for example the following method illustrated in FIGS. 44 and 45. The last illumination array 6080 with right eye illumination group 6100 applied to the light emitting element array 15 (such as an LED array) and the proposed next array 6082 with left eye group 6102 are logical XNOR (exclusive NOR) together to produce array 6084 which identifies the LED group 6085 which did not change state between left and right illumination phases. It will be apparent that many of the LEDs that do not change state were not illuminated in either phase, and these may be identified by logical ANDing the array 6084 with the array 6070 which identified the transition LED group 6072 by the method described with reference to FIG. 43.

Array 6088 contains LED 6108 to which a correction can be applied to reduce flicker artifact. Looking at array 6080, the original state of LED 6108 was ON, then a low brightness correction pulse (e.g. reduced width pulse) may be appropriate to correct a bright flash artifact. This is applied with reference to control flow of FIG. 30 and circuit blocks of FIG. 35. Similarly if the array 6090 with right eye illumination group 6200 is XNORed with the proposed next array 6092 with left eye illumination group 6202 to give the array 6094 representing the LEDs that do not change state, and this group is logical ANDed with the transition LED group 6072 of array 6070, the resulting array 6098 contains the LED (in this case 6110) which benefit from an applied correction. As the original state of this LED in array 6090 was OFF, then an extra pulse is needed to correct for a dark flash artifact.

Implementation for correction of the artifact illustrated in FIGS. 36 and 37 may be achieved by inserting a data shift of the groups 402, 404 prior to characterizing the switched LEDs. In this manner the same process can be achieved, with a gap reinserted after correction.

Advantageously the present embodiments are readily compatible with implementation by circuitry including but not limited to ASICs and FPGAs, for example implementation of the flow diagram of FIG. 30.

The arrangements of FIGS. 24-45 may be applied to temporally multiplexed displays in which a illuminator element is arranged to change phase to switch from left to right window imagery. Such displays may include, but are not limited to optical valve directional backlights, Fresnel lens, microlens array, wedge type illumination systems, and so forth.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. An autostereoscopic display apparatus comprising:
a display device comprising:
a transmissive spatial light modulator comprising an array of pixels arranged to modulate light passing therethrough;
a waveguide having an input end and first and second, opposed guide surfaces for guiding light along the waveguide that extend from the input end across the spatial light modulator; and
an array of light sources at different input positions in a lateral direction across the input end of the waveguide, the waveguide being arranged to direct input light from light sources at the different input positions across the input end as output light through the first guide surface for supply through the spatial light modulator into respective optical windows in output directions distributed in the lateral direction in dependence on the input positions
the autostereoscopic display apparatus further comprising:
a sensor system arranged to detect the position of an observer relative to the display device; and
a control system arranged to control the spatial light modulator and the light sources, wherein the control system is arranged to control the spatial light modulator to modulate light with left and right images temporally multiplexed in left and right image phases that alternate with each other, and the control system is arranged to operate the light sources in the left and right image phases, selectively to direct the left and right images into respective viewing windows comprising at least one optical window in positions corresponding to left and right eyes of an observer, in dependence on the detected position of the observer, the control system being arranged, when the position of the viewing windows is static, to operate individual light sources over a single phase so that the time-average of luminous flux has a predetermined value, and the control system being arranged, when shifting the position of the viewing windows in response to the detected position of the observer changing, to control light sources corresponding to optical windows of left and right viewing windows that are closest to each other by ceasing operation of a given light source in one of the left and right image phases and starting operation of the same or different light source in the other one of the left and right image phases, in a manner in which, over each adjacent pair of a left image phase and a right image phase, the time-average of the luminous flux of said given light source and the luminous flux of said same or different light source is more than zero and less than twice said predetermined value.

2. An autostereoscopic display apparatus according to claim 1, wherein the control system is arranged, when shifting the position of the viewing windows in response to the detected position of the observer changing, to control the operation of said given light source in its final instance of operation in said one of the left and right image phases so that over that phase the time-average of luminous flux is less than the predetermined value and to control the operation of said same or different light source in its initial instance of operation of said other of the left and right image phases so that over that phase the time-average of luminous flux is the predetermined value.

3. An autostereoscopic display apparatus according to claim 1, wherein the control system is arranged, when shifting the position of the viewing windows in response to the detected position of the observer changing, to control the operation of said given light source in its final instance of operation of said one of the left and right image phases so that over that phase the time-average of luminous flux is the predetermined value and to control the operation of said same or different light source in its initial instance of operation of said other of the left and right image phases so that over that phase the time-average of luminous flux is less than the predetermined value.

4. An autostereoscopic display apparatus according to claim 1, wherein the control system is arranged, when shifting the position of the viewing windows in response to the detected position of the observer changing, to control the operation of said given light source in its final instance of operation of said one of the left and right image phases so that over that phase the time-average of luminous flux is less than the predetermined value, and to control the operation of said same or different light source in its initial instance of operation of said other of the left and right image phases so that over that phase the time-average of luminous flux is less than the predetermined value.

5. An autostereoscopic display apparatus according to claim 4, wherein said final instance of operation of said one of the left and right image phases of said given light source is before said initial instance of operation of said other of the left and right image phases of said same or different light source.

6. An autostereoscopic display apparatus according to claim 4, wherein said final instance of operation of said one of the left and right image phases of said given light source is after said initial instance of operation of said other of the left and right image phases of said same or different light source and each of the time integral of luminous flux over the final instance of operation of said one of the left and right image phases and the time-average of luminous flux over the initial instance of operation of said other of the left and right image phases is less than half the predetermined value.

7. An autostereoscopic display apparatus according to claim 1, wherein the light sources operated in the left image phases are contiguous in the array of light sources with the light sources operated in the right image phases so that said same or different light source is the same light source as said given light source.

8. An autostereoscopic display apparatus according to claim 1, wherein the light sources operated in the left image phases are separated in the array of light sources with the light sources operated in the right image phases so that said same or different light source is a different light source from said given light source.

9. An autostereoscopic display apparatus according to claim 1, wherein the first guide surface is arranged to guide light by total internal reflection and the second guide surface comprises a plurality of light extraction features oriented to reflect light guided through the waveguide in directions allowing exit through the first guide surface as the output light.

10. An autostereoscopic display apparatus according to claim 9, wherein the second guide surface has intermediate regions between the light extraction features that are arranged to direct light through the waveguide without extracting it.

11. An autostereoscopic display apparatus according to claim 10, wherein the second guide surface has a stepped shape comprising facets, that constitute said light extraction features, and said intermediate regions.

12. An autostereoscopic display device according to claim 1, wherein the first guide surface is arranged to guide light by total internal reflection and the second guide surface is substantially planar and inclined at an angle to reflect light in directions that break the total internal reflection for outputting light through the first guide surface, the display device further comprising a deflection element extending across the first guide surface of the waveguide for deflecting light towards the normal to the spatial light modulator.

13. An autostereoscopic display apparatus according to claim 1, wherein the waveguide has a reflective end facing the input end for reflecting light from the input light back through the waveguide, the waveguide being arranged to output light through the first guide surface after reflection from the reflective end.

14. An autostereoscopic display apparatus according claim 13, wherein the reflective end has positive optical power in the lateral direction.

* * * * *